United States Patent [19]

Rogers et al.

[11] Patent Number: 4,461,886

[45] Date of Patent: Jul. 24, 1984

[54] SUBSTITUTED BIREFRINGENT POLYAMIDE

[75] Inventors: Howard G. Rogers, Weston, Mass.; Russell A. Gaudiana, Merrimack, N.H.; Jeannette S. Manello, Lawrenceville, N.J.; Ronald A. Sahatjian, Lexington, Mass.

[73] Assignee: Polaroid Corporation, Cambridge, Mass.

[21] Appl. No.: 486,800

[22] Filed: Apr. 20, 1983

Related U.S. Application Data

[63] Continuation-in-part of Ser. No. 238,069, Mar. 2, 1981, Pat. No. 4,384,107.

[51] Int. Cl.$^3$ ............................................. C08G 69/12
[52] U.S. Cl. ..................................... 528/331; 526/242; 526/247; 526/248; 526/296; 526/312; 528/205; 528/208; 528/210; 528/321
[58] Field of Search ............... 528/331, 205, 208, 210, 528/321; 526/312, 242, 247, 248, 296

[56] References Cited

U.S. PATENT DOCUMENTS

| | | | |
|---|---|---|---|
| 3,575,933 | 4/1971 | Hoegger et al. | 528/331 |
| 3,600,350 | 8/1971 | Kwolek | 528/331 |
| 3,671,542 | 6/1972 | Kwolek | 260/30.8 |
| 3,753,957 | 8/1973 | Jones | 528/331 |
| 3,869,429 | 3/1975 | Blades | 528/331 |

*Primary Examiner*—Harold D. Anderson
*Attorney, Agent, or Firm*—Louis G. Xiarhos

[57] ABSTRACT

A class of polyamides comprising recurring units having certain substituted-biphenylene or substituted-stilbene radicals is disclosed. The substituted radicals include substituents so as to confer a non-coplanar molecular configuration and a substantially cylindrical distribution of electron density about the long axis of the recurring units and the chain-extended polymers including such radicals.

Molecularly oriented polymers of the invention exhibit optically uniaxial properties. The highly birefringent polymers are suited to application in optical filter and other devices where a refractive and birefringent material is desired.

30 Claims, 5 Drawing Figures

SUBSTITUTED BIREFRINGENT POLYAMIDE

CROSS-REFERENCE TO RELATED APPLICATION

This application is a continuation-in-part of our co-pending U.S. patent application, Ser. No. 238,069, filed Mar. 2, 1981, now U.S. Pat. No. 4,384,107.

BACKGROUND OF THE INVENTION

This invention relates to a novel class of polymers exhibiting optically anisotropic properties. More particularly, it relates to a class of substituted polyamides having a highly birefringent character.

Materials having a birefringent character have been variously applied in connection with the construction of filter and other optical devices. Frequently, a birefringent element utilized in an optical filter or other device will comprise a plate made from a monocrystalline form of birefringent optical material. Single crystals are expensive materials and are not readily formed to the desired shape or conformation required in particular applications. The size to which such crystals can be grown represents an additional limitation on the utilization of such materials in optical devices.

Optical devices including a birefringent material in the form of a polymeric layer, such as may be formed by the unidirectional stretching of a suitable polymeric material, have also been described. Thus, light-polarizing devices utilizing a polymeric birefringent layer have been described in U.S. Pat. No. 3,213,753 (issued Oct. 26, 1965 to H. G. Rogers). Optical devices including polymeric birefringent materials have also been set forth, for example, in U.S. Pat. No. 3,506,333 (issued Apr. 14, 1970 to E. H. Land) and in U.S. Pat. No. 3,610,729 (issued Oct. 15, 1971 to H. G. Rogers). Frequently, the efficiency of an optical filter, polarizing or other optical device including a birefringent element or layer will depend upon the realization of large net differences in refractive index between birefringent material and adjacent or contiguous materials. In general, such net differences will be maximized where a birefringent material is highly birefringent. Correspondingly, large net differences in refractive indices of contiguous materials will be unattainable where birefringent polymeric materials otherwise suited to application in an optical device tend to exhibit either low or only marginal birefringent character. Accordingly, polymeric materials exhibiting a highly birefringent character will be of particular interest for optical applications and enhanced efficiency.

SUMMARY OF THE INVENTION

The present invention provides a class of polymers exhibiting high birefringence and is based in part upon the discovery that the incorporation into a polyamide of certain divalent substituted aromatic radicals, in the form of substituted aromatic radicals having the phenylene moieties thereof in a non-coplanar molecular configuration, imparts to the polyamide material an unusually high anisotropic or birefringent character. Transparent polymeric materials exhibiting uniaxial optical properties, i.e., only two indices of refraction, are provided by the present invention. These polymers comprise certain repeating or recurring units in chain-extended relation, the recurring units including divalent substituted aromatic radicals. The presence of substituent groups in the recurring units such that the aromatic nuclei thereof are in a non-coplanar molecular configuration permits the provision of a substantially cylindrical distribution of electron density about the long axis of the polymer and the realization of high birefringence. There is thus simulated in a polymeric material optical properties of a uniaxial crystal. The present invention, thus, provides a class of polymers comprising recurring units of the formula

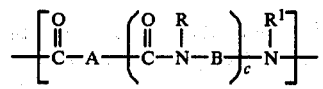

wherein each of A and B is a divalent radical, except that B can additionally represent a single bond; R and $R^1$ are each hydrogen, alkyl (e.g. methyl, ethyl), aryl (e.g., phenyl, naphthyl), alkaryl (e.g., tolyl), or aralkyl, (e.g., benzyl); and c is zero or one; and wherein, when c is one, at least one of A and B is a divalent radical selected from the group consisting of:

(1) a radical 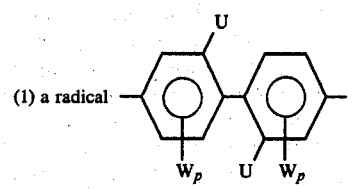

where each U is a substituent other than hydrogen, each W is hydrogen or a substituent other than hydrogen, and each p is an integer from 1 to 3, said U and $W_p$ substitution being sufficient to provide said radical with a noncoplanar molecular configuration; and (2) a radical 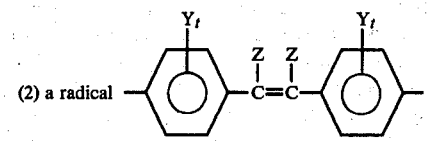

where each of Y and Z is hydrogen or a substituent other than hydrogen and each t is an integer from 1 to 4, with the proviso that when each said Z is hydrogen, at least one said Y substituent is a substituent other than hydrogen positioned on the corresponding nucleus ortho with respect to the

moiety of said radical, said Z and $Y_t$ substitution being sufficient to provide said radical with a non-coplanar molecular configuration;
and wherein, when c is zero, A is a divalent radical selected from the group consisting of radicals (1) and (2) as hereinbefore defined.

THE DRAWINGS

DETAILED DESCRIPTION OF THE INVENTION

As described hereinbefore, the substituted polyamides of the present invention comprise recurring units of the formula

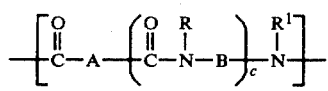

Formula I wherein c is zero or one and wherein A (when c is zero) or at least one of A and B (when c is one) comprises a substituted divalent biphenylene radical or a substituted divalent stilbene radical. Thus, when c is zero, divalent radical A comprises a substituted biphenylene radical having a non-coplanar molecular configuration or a substituted divalent stilbene radical of non-coplanar molecular configuration. Similarly, when c is the integer one, one or both of divalent radicals A and B comprises such substituted-biphenylene or substituted-stilbene radicals.

The molecularly oriented and highly birefringent polymers of the present invention comprise repeating molecular units represented by the structure of Formula I. These units exhibit high electron density substantially cylindrically distributed about the long axis thereof. The optically uniaxial character of molecularly oriented substituted-biphenylene and substituted-stilbene polyamides of the present invention is importantly related to the molecular configuration or structure of the substituted-biphenylene and/or substituted-stilbene radicals of the repeating units of the polymer and to the distribution of electron density. The presence of substituent groups on the biphenylene and/or stilbene radicals such that the phenylene moieties thereof are in a non-coplanar relation to one another so as to provide a substantially cylindrical distribution of electron density about the long axis of the polymer and the recurring units thereof permits the realization of high birefringence and the simulation in a polymeric material of optical properties of a uniaxial crystal.

The birefringence of oriented polymers of the present invention can be represented in relation to molecular configuration and electron density distribution according to a dimensionless geometric index G set forth by the relationship:

$$G = 0.222 \times E \times \frac{L}{D}$$

wherein E is a dimensionless eccentricity factor defined by the relationship $$E = \frac{1 + e_L}{1 + e_T}$$

where $e_L$ is the longitudinal eccentricity of the polarizability of the repeating molecular unit and $e_T$ is the transverse eccentricity of the electron polarizability of the repeating molecular unit, L is the length of the repeating molecular unit along the main axis thereof and D is the mean diameter of the repeating molecular unit. The contribution to birefringence of the molecular structure of a repeating, chain-extending unit of a substituted-biphenylene or substituted-stilbene polyamide of the present invention will be better understood by reference to the drawings hereof.

Figure 2:
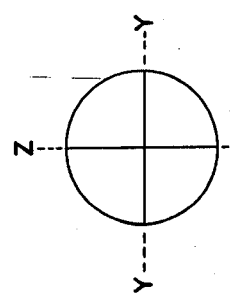
FIG. 2 is a cross-sectional view along the line 1—1 of FIG. 2.
Figure 1:
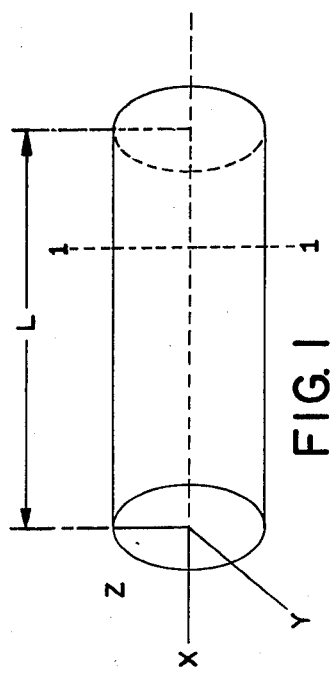
FIG. 1 is a geometric representation of molecular dimensions of a repeat unit of a polymeric material of the invention.

In FIG. 1 is shown a geometrical representation of a repeating chain-extending molecular unit of a polymeric material of the present invention. Each repeating unit may thus be visualized as a repeating rod-like segment of finite length L and of a generally cylindrical configuration. Birefringence has been found to be importantly related to the molecular structure of the repeating units of the polymer in accordance with the relationship of geometric index G, set forth hereinbefore. A highly birefringent polymeric material of the invention will comprise a plurality of molecular units in chain-extended relationship, each unit having a length L, shown in FIG. 1. The long axis X of each repeating unit forms, in the chain-extended polymer, the long axis or backbone. Each axis in FIG. 1 forms a right angle with respect to any other axis. The mean diameter D, set forth in the geometric index G, is determined for each repeating unit by the expression $D=(Y+Z)/2$. In FIG. 2 is shown along line 1—1 of FIG. 1, a cross-sectional view. The shown Y and Z axes are at right angles to one another, the X axis comprising the axis of the cylinder extending in a direction normal to the plane of the paper.

Figure 4B:
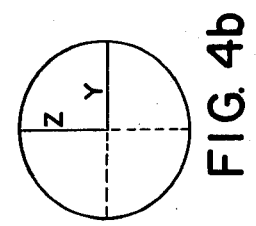
FIGS. 4a and 4b show, respectively, ellipsoidal and circular cross-sectional distribution of electron density about the long axis of a recurring unit of a polymeric material of the invention.
Figure 4A:
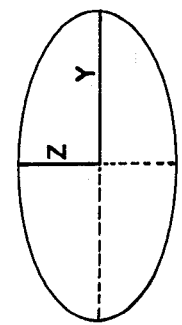
Figure 3:
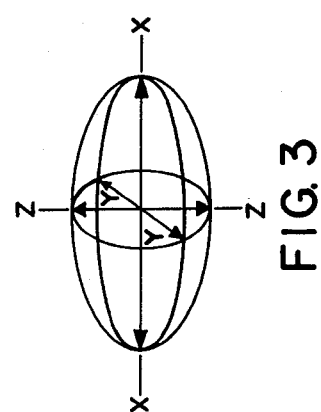
FIG. 3 is a vectorial representation of bond and group polarizabilities of a repeat unit of a polymeric material of the invention.

In addition to a rigid rod-like geometry in a polymeric material as the result of an end-to-end combination of repeating units hereof, the electron density distributed around the long axis of the polymer, variously treated as a cylindrical or ellipsoidal distribution, is believed to comprise a major contributing factor to optical anisotropy or birefringence. High electron density substantially cylindrically distributed around the long axis of a polymer is exhibited in a polymer of coaxially-bonded repeating units comprising non-coplanar, particularly orthogonal, substituted biphenylene and/or substituted-stilbene radicals. An orthogonal relationship between adjacent phenylene rings can be nearly attained by the placement of substituents with large steric effects on the ortho-positions of next adjacent phenylene rings. In FIG. 3 is shown a vectorial representation of bond and group polarizabilities of a repeating unit of a polymer of the invention. It will be appreciated that electron density distribution about axis X will be variously treated as a cylindrical or ellipsoidal distribution depending upon the relative magnitudes of the Y and Z vectors. In FIG. 4a is shown an ellipsoidal cross-section along the axis of FIG. 3 where the magnitude of the shown Y vector is greater than that of the Z vector. Ideally, Y and Z vectors would be equal and the resulting circular cross-sectional distribution along the X axis is shown in FIG. 4b.

By a combination of longitudinal eccentricity ($e_L$) and transverse eccentricity ($e_T$), based upon bond and group polarizabilities, and the length and mean diameter of a repeating unit, a geometric index, G, related to optical anisotropy or birefringence, can be represented as follows:

$$G = 0.222 \left( \frac{1 + e_L}{1 + e_T} \right) \frac{L}{D}$$

wherein $e_L$, $e_T$, L and D have the meanings hereinbefore ascribed. Longitudinal eccentricity $e_L$ may be represented according to the following relationship $$e_L = \frac{\sqrt{X^2 - \left( \frac{Y + Z^2}{2} \right)}}{X}$$

Transverse eccentricity $e_T$ may be represented by the relationship $$e_T = \frac{\sqrt{Y^2 - Z^2}}{Y}$$

wherein the magnitude of vector Y is the larger of the Y and Z vectors. Ideally, transverse eccentricity $e_T$ will equal zero and longitudinal eccentricity $e_L$ will equal one, in which case, the eccentricity factor, E, will equal the theoretical maximum of two.

Geometric index G can be calculated for repeating units of a rigid rod-like polymeric material of the present invention by resort to mean diameter and length values and longitudinal and transverse eccentricity values calculated from experimentally determined dihedral angles. It will be appreciated that the magnitude of values of length, mean diameter, longitudinal eccentricity and transverse eccentricity will materially influence the value of geometric index G. Thus, it will be appreciated that a repeating unit having, for example, a length of about twice that of a repeating unit having a different molecular structure and configuration will have a geometric index of about twice that of such different repeating unit. Accordingly, in making comparisons of geometric indices and magnitude thereof in relation to structural differences between comparative molecular repeating units, such differences in length should be borne in mind.

In general, experimentally determined values of birefringence for polymers comprised of repeating units as aforedescribed, will correlate directionally with values of geometric index, G, of the repeating units. Thus, recurring units having higher geometric index values, will, in general, provide polymers exhibiting higher birefringence. Polymeric materials comprised of repeating units as aforedescribed, depending upon the nature of substituent groups and the influence thereof on electron density distribution, will generally be comprised of repeating units having a geometric index value, G, of about 0.8 or higher. It will be preferred, however, that polymeric materials hereof comprise repeating units having geometric index values of one or higher. Especially preferred herein are polymers comprising repeating units of geometric index value of 1.2 or higher.

High birefringence observed in the case of substituted-biphenylene and substituted-stilbene polyamides comprised of recurring units of high geometric index value (G) is believed to be importantly related to the presence in such units of phenylene rings in "twisted" relation to one another, i.e., where the phenylene rings are in non-coplanar molecular configuration with respect to each other or, preferably, in mutually orthogonal planes. It has been found, for example, in the case of substituted-biphenylene polyamides, that the presence of substituent moieties on the ortho-positions of interbonded phenylene rings, of a type such as to effect a non-coplanar molecular configuration with respect to the interbonded phenylene rings, provides a recurring unit having a high geometric index. The condition of non-coplanarity among phenylene rings in such a recurring unit, or presence in such units of rings in "twisted" configuration relative to one another has been found to be importantly related to high birefringence in the rigid rod-like oriented polymers resulting from the end-to-end joining of such recurring units. Similarly, the presence of substituents on the vinylene or aromatic nuclei of a stilbene radical promotes a condition of non-coplanarity among such nuclei and high geometric index and birefringence.

As described hereinabove, birefringent substituted-biphenylene and substituted-stilbene polyamides of the present invention include those comprising recurring units of the formula

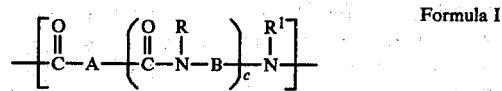

Formula I wherein C is zero or one. It will be appreciated that polyamides comprising the following recurring units are contemplated when c is one:

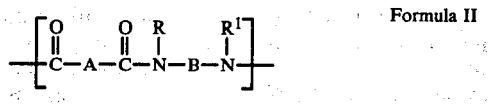

Formula II

In such recurring units, at least one of divalent radicals A and B will comprise a substituted-biphenylene or substituted-stilbene radical of non-coplanar molecular configuration conforming to the formulae:

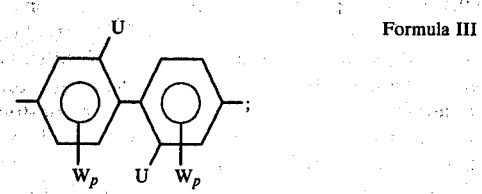

Formula III or

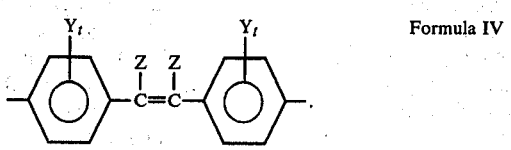

Formula IV

In the case of substituted-biphenylene radicals A and/or B of the type represented by Formula III, U will comprise a substituent other than hydrogen; W will comprise hydrogen or a substituent other than hydrogen; and p will be an integer of from 1 to 3. It will be appreciated from the nature of U, W and p, as set forth, that each aromatic nucleus of the biphenylene radical represented by Formula III will be substituted at the ortho-position by a moiety other than hydrogen and that each interbonded phenylene ring can contain additional substituents. Preferably, each W of each phenylene ring will be hydrogen such that the substituted-biphenylene radical of Formula III has the following structure:

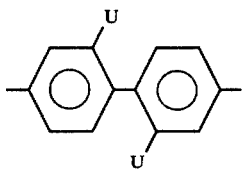

Formula V wherein each U substituent, as defined, is a substituent other than hydrogen. It will be appreciated that polymeric materials comprised of such recurring units will be preferred from the standpoint of ease of preparation.

The nature of substituents U and W of the biphenylene radical of Formula III can vary widely, consistent with the provision of a biphenylene radical having a non-coplanar molecular configuration. As used herein, the term non-coplanar molecular configuration refers to a molecular configuration whereby the two aromatic nuclei of the biphenylene radical are in different planes.

While applicants do not wish to be bound by precise theory or mechanism in explanation of the highly birefringent character observed in oriented polymers comprising recurring units of high geometric index, it is believed that such character is importantly related to the non-coplanarity conferred or promoted by the presence of substituents in the aforedescribed recurring units. It is believed that the ortho-positioning of atoms or moieties other than hydrogen on the interbonded nuclei of a biphenylene radical materially reduces coplanarity. This non-coplanarity provides a distribution of high electron density substantially cylindrically about the long axis of the polymer. This distribution of electron density is believed to contribute at least in part to unusually high birefringence observed in such polymers.

The nature of substituency U and Wp should be such as to provide the biphenylene radical of Formula III with a non-coplanar molecular configuration referred to hereinbefore. Such configuration will in part be determined by the size of non-hydrogen U substituents on the aromatic nuclei of the biphenylene radical and upon the number and positioning of any other non-hydrogen substituents as may be substituted on such aromatic nuclei. For example, where the interbonded aromatic nuclei contain large or bulky U substituents, such as trifluoromethyl groups, the desired condition of non-coplanarity is more readily realized. Similarly, where the U substituents are relatively small, such as chloro groups, an additional non-hydrogen W substituent at the ortho-position of each nucleus can increase desired non-coplanarity. Suitable U substituents herein include halogen (e.g., fluoro, chloro, bromo, iodo); nitro; alkyl (e.g., methyl, ethyl); alkoxy (e.g., methoxy); trifluoromethyl; cyano; hydroxy; hydroxyalkyl (e.g., hydroxyethyl); thioalkyl (e.g., thiomethyl); carboxy; sulfonic acid esters; sulfinic acid esters, carboxamide; sulfonamide; amino; and carbonyl. Each substituent W can comprise hydrogen or a substituent other than hydrogen as set forth in connection with substituent U. Preferably, each W will be hydrogen and each p will be the integer 3.

Preferred polyamides herein are the polyamides comprising recurring units having the biphenylene radical of Formula V, i.e.,

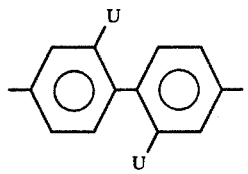

Formula V wherein each U, which may be the same or different, is halo, nitro, alkoxy or substituted-alkyl, such as trifluoromethyl.

In the polyamides of the present invention which comprise recurring units represented by the following formula

Formula II either or both of radicals A and B can comprise the substituted stilbene radical set forth hereinbefore as Formula IV, i.e.,

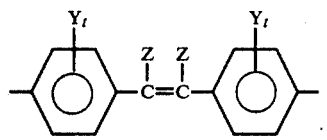

Formula IV

In such stilbene radicals, the nature of each Y and Z will be such as to provide the radical with a non-coplanar molecular configuration. Preferably, non-coplanarity will be provided by the presence of a single non-hydrogen substituent Z. Where each Z is hydrogen, non-coplanarity can be provided by the positioning of a non-hydrogen Y substituent on at least one aromatic nucleus of the radical in an ortho relationship to the

moity of the radical. Suitable non-hydrogen Y and Z substituents include, for example, any of those set forth in connection with radicals U and W defined hereinbefore.

Examples of the preferred substituted-stilbene radicals included within the class represented by Formula IV include the following:

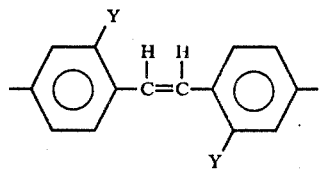

Formula VI wherein at least one of the Y substituents is other than hydrogen, preferably, halo or alkoxy; and

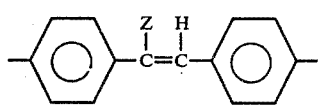

Formula VII where Z is a substituent other than hydrogen, preferably halo.

Where only one of said A and B radicals is a substituted-biphenylene or substituted-stilbene radical conforming to the radicals represented by the structures of Formulas III and IV, the remaining A or B radical can comprise any of a variety of divalent radicals so long as the birefringent properties of the polyamide material are not effectively negated. In general, where only one of the A and B radicals conforms to the structures represented by the Formulas III and IV, the remaining A or B radical will desirably be a divalent radical which does not confer transverse eccentricity to the recurring unit. Similarly, where one of radicals A or B is a radical which confers transverse eccentricity to the recurring unit, the other of radical A or B will desirably be a radical which confers high longitudinal eccentricity such that the recurring unit of the polymer exhibits a high geometric index.

When only one of radicals A and B is a substituted-biphenylene or substituted-stilbene radical, the other of A or B can be any of a variety of divalent radicals including, for example, unsubstituted biphenylene or stilbene radicals; phenylene; transvinylene; or ethynylene. Also suitable are polyunsaturated divalent radicals conforming to the formula

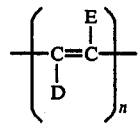

where n is an integer of at least two (e.g., two or three) and each of D and E is hydrogen or alkyl (e.g., methyl) and inclusive of such polyunsaturated divalent radicals as trans-trans-1,4-butadienylene, i.e.,

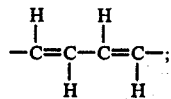

and 1,4-dimethyl-trans-trans-1,4-butadienylene, i.e.,

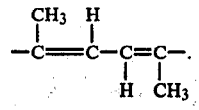

It will be appreciated that compounds containing amino groups directly attached to carbon atoms having aliphatic unsaturation are not stable. Accordingly, the aforesaid vinylene, ethynylene and butadienylene radicals cannot serve as B radicals in the recurring units represented by the structure of Formula II.

Where only one of radicals A and B is substituted-biphenylene radical of Formula III or a substituted-stilbene radical of Formula IV, the other of A or B can be a radical which does not conform to the structure of Formula II but which has a non-coplanar molecular configuration and a substantially cylindrical distribution of electron density about the long axis thereof.

In general, from the standpoint of maximized birefringent properties, it will be preferred that each of radicals A and B comprise a divalent substituted-biphenylene or substituted-stilbene radical exhibiting a non-coplanar molecular configuration and conforming to the structures of Formulas III or IV. It will be appreciated, however, that the particular nature of such A and B radicals may affect the capacity of the polyamide material to be readily oriented, as by extrusion, stretching or the like. Accordingly, where the capacity of a polyamide material to be oriented is effectively reduced by the presence in the polyamide of each of radicals A and B of non-coplanar molecular configuration and conforming to the structure of Formula III or IV, it will be preferred that only one of such radicals A and B of the polyamide material conform to the structure thereof.

Inclusive of polyamides of the present invention represented by the structure of Formula II are those having recurring units represented by the following structures wherein, unless otherwise specified, U, W, p, Y, Z and t have the meanings set forth hereinbefore:

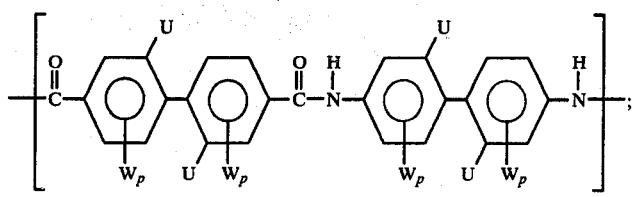

Formula VIII

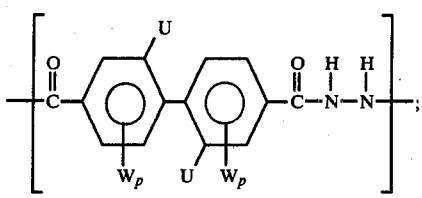

Formula IX

-continued
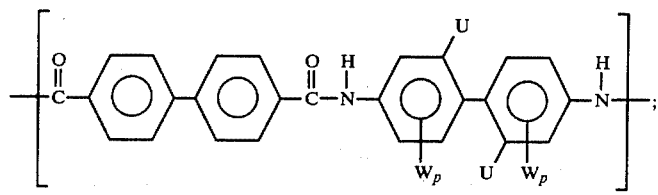
Formula X
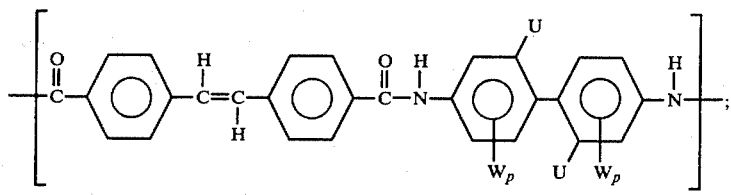
Formula XI
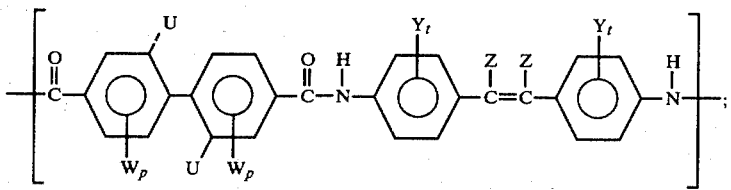
Formula XII
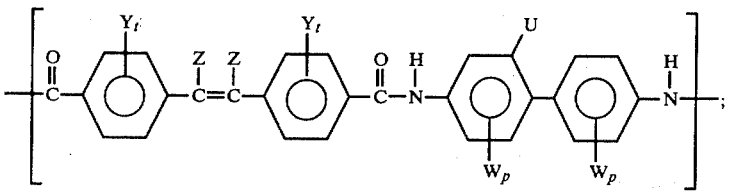
Formula XIII
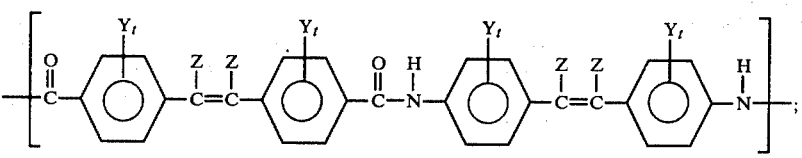
Formula XIV
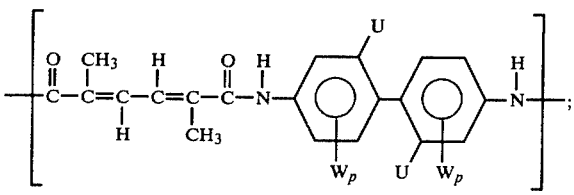
Formula XV
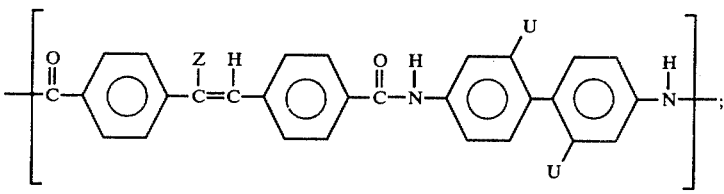
Formula XVI
where Z is other than hydrogen; and
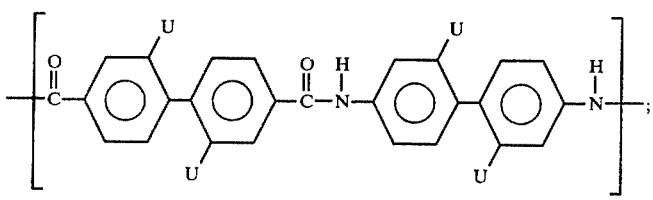
Formula XVII From inspection of the general formula set forth as descriptive of recurring units of the polyamides of the present invention, i.e., recurring units of the formula

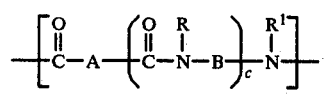

Formula I it will be appreciated that, when c is zero, the recurring units will be represented by the following formula:

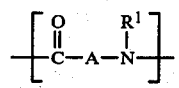

Formula XVIII

In such recurring units, radical A will comprise a divalent radical having a non-coplanar molecular configuration and conforming to the structures of Formulas III and IV set forth hereinbefore, i.e.,

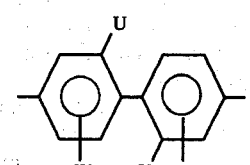

Formula III or

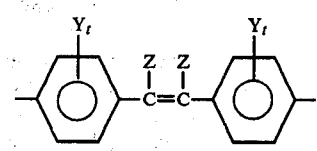

Formula IV where U, W, p, Y, t and Z have the same meanings.

Inclusive of polyamides of the present invention represented by the structure of Formula XVIII are those having recurring units represented by the following structures wherein U, W, p, Y, Z and t, unless otherwise indicated, have the meanings set forth hereinbefore:

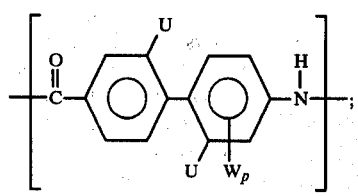

Formula XIX

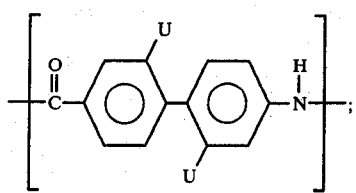

Formula XX

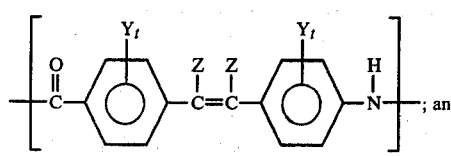

Formula XXI

; and

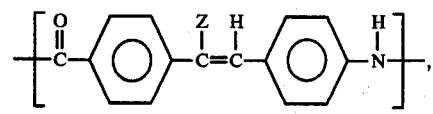

Formula XXII where Z is other than hydrogen.

While the substituted-biphenylene and substituted-stilbene polyamides described heretofore consist essentially of recurring units represented by the structures of Formulas III and XVI, i.e., recurring units of the formulas

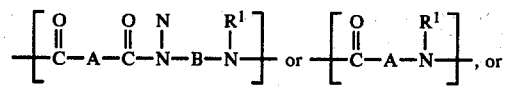

a combination of such recurring units, the substituted polyamides can also comprise recurring units not conforming to the described structures of Formulas III and XIV. Examples of recurring units which do not conform to such descriptions and which can be present in such polyamides in proportions which do not negate the high birefringence of the polymeric materials include, for example, recurring units having the formulas

wherein G is a divalent radical such as 1,4-phenylene; 4,4'-biphenylene; vinylene; trans,trans-1,4-dimethyl-trans,trans-1,4-butadienylene; 2,4'-trans-vinylenephenylene; trans,trans-4,4'-bicyclohexylene; 2,5,7-bicyclooctatriene-1,4-, i.e.,

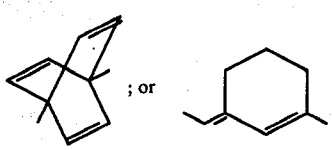

; or

Divalent radical G can also comprise radicals having a non-coplanar molecular configuration and a substantially cylindrical distribution of electron density about the long axis thereof. Other divalent radicals can, however, serve as radical G provided that such radicals do not adversely and materially reduce the birefringence of the polyamide material. It will be appreciated that G cannot represent an aliphatic unsaturated moiety where such moiety is to be bonded between two amino groups.

The polyamides of the present invention can be prepared by resort to polyamide synthesis routes involving the polymerization of suitable acid halide and amine monomers in an organic solvent which may contain a solubilizing agent such as lithium chloride or chain-terminating agent where desired. Polyamides of the type represented by the structure of Formula I can be prepared, for example, by reaction of a dicarboxylic acid halide of the formula

with a diamine of the formula

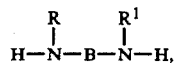

where Hal represents halogen, such as chloro or bromo and A and B have the meanings hereinbefore set forth, except that B cannot represent an aliphatic unsaturated moiety. Where B desirably represents a single bond in the polymers hereof, the aforesaid dicarboxylic acid halide of the formula

can be suitably reacted with hydrazine. The polymers of the present invention can be prepared in an organic solvent such as N-methyl pyrrolidone (NMP), tetramethylurea (TMU) or a mixture thereof, and preferably, in the presence of a salt such as lithium chloride to assist in the solubilization of reactant monomers and maintenance of a fluid reaction mixture. The preparation of a polyamide of the present invention can be illustrated by reference to the preparation of poly(2,2'-dibromo-4,4'-biphenylene)-trans- -bromo-p,p'stilbene dicarboxamide, a preferred polyamide herein, in accordance with the following reaction scheme:

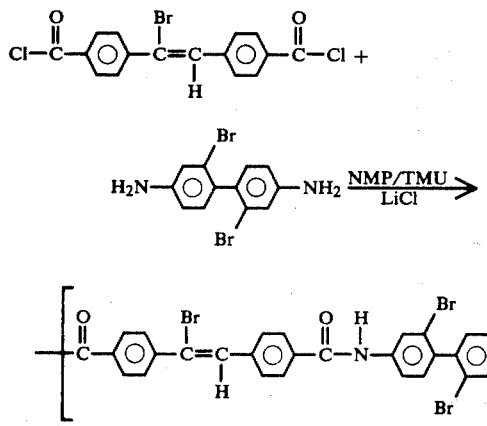

Polyamides containing recurring units having the structure represented by Formula XVII, i.e.,

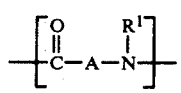

can be prepared, for example, by the polymerization of a p-amino-aroyl halide monomer in the form of a halide, arylsulfonate, alkylsulfonate, acid sulfonate, sulfate or other salt. This polymerization can be illustrated by reference to the preparation of poly(2,2'-dibromo-4,4'-biphenylene)carboxamide in accordance with the following reaction scheme showing the polymerization of the hydrochloride salt of 2,2'-dibromo-4-amino-4'-chlorocarbonylbiphenyl:

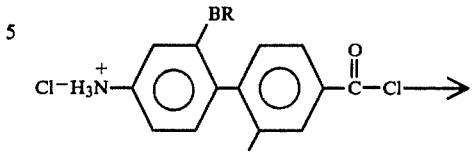

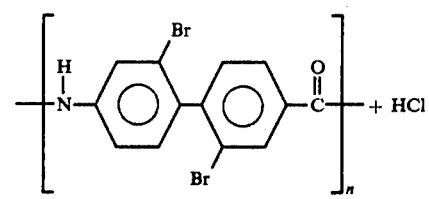

The substituted polyamides of the present invention can be prepared by polymerization of correspondingly substituted monomers in a suitable organic reaction solvent. Such solvents include amide and urea solvents including N-methylpyrrolidone and N,N,N'N'-tetramethylurea. Other suitable reaction solvent materials include N-methylpiperidone-2; N,N-dimethylpropionamide; N-methylcaprolactam; N,N-dimethylacetamide; hexamethylphosphoramide; and N,N'-dimethylethyleneurea. The polymerization can be conducted by dissolving the monomer or monomers to be polymerized in the reaction solvent and allowing the exothermic polymerization reaction to occur usually with the aid of external cooling. In general, the polymerization will be conducted initially at a temperature of from about $-20°$ C. to about 15° C., and preferably, in the range of from about $-5°$ C. to about 5° C. Thereafter, usually within about one-half hour to one hour, the reaction will be heated with formation of a thickened polymeric mass of gel-like consistency. In general, the polymerization reaction will be conducted over a period of from about 1 to 24 hours, preferably about 3 to 18 hours.

While the monomer or monomers to be polymerized can be dissolved in a suitable amide or urea solvent and allowed to react with formation of the desired polymeric material, a preferred reaction sequence where a mixture of copolymerizable monomers is utilized involves the preparation of a solution of a first monomer in the amide or urea solvent and the addition thereto of a second or other monomer or a solution thereof in a suitable organic solvent therefor, such as tetrahydrofuran. External cooling of the resulting reaction mixture provides the desired polyamide material in high molecular weight and minimi/es the production of undesired side reactions or by-products.

The polyamide materials prepared as described can be recovered by combining the polymerization reaction mixture with a non-solvent for the polymer and separating the polymer, as by filtration. This can be effectively accomplished by blending the polymerization mixture with water and filtering the solid polyamide material. The polyamide can be washed with an organic solvent such as acetone or ether and dried, for example, in a vacuum oven.

Starting materials for the preparation of substituted polyamides of the invention can be prepared by resort to known synthetic methods. For example, the reactant 2,2'-dibromobenzidine (utilized as a reactant in the production of the polyamides of EXAMPLES 1, 3, 5, 7, 8 and 9 hereof) can be prepared by an electrophilic bromo-substitution of 4,4'-dinitrobiphenyl (as by reaction with bromine and silver sulfate in the presence of sulfuric acid) followed by a reduction of the nitro groups of the resulting 2,2'-dibromo-4,4'-dinitrobiphenyl compound by the action, for example, of stannous chloride and hydrochloric acid. This preparative route is set forth in the following reaction scheme:

electrophilic bromo-substitution utilizing bromine and silver sulfate in the presence of sulfuric acid, followed by acid hydrolysis and conversion of the resulting 2,2'-dibromo-4,4'-biphenylene dicarboxylic acid to the corresponding acid chloride by reaction with thionyl chloride. This synthesis is set forth in the following reaction scheme:

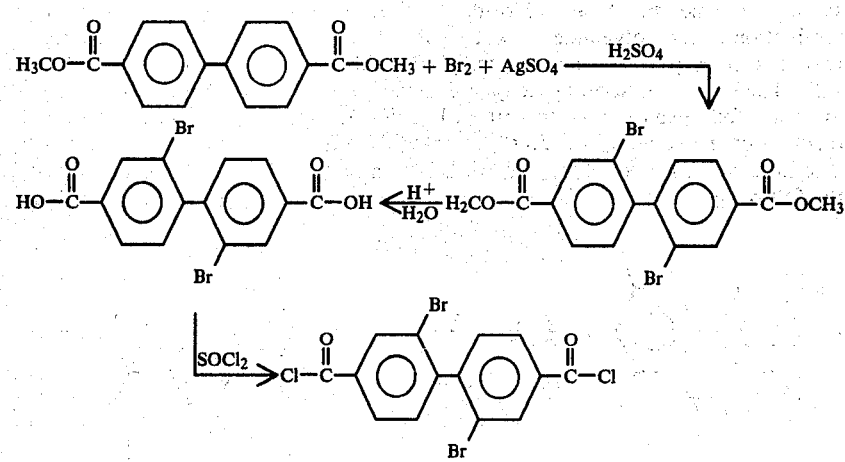

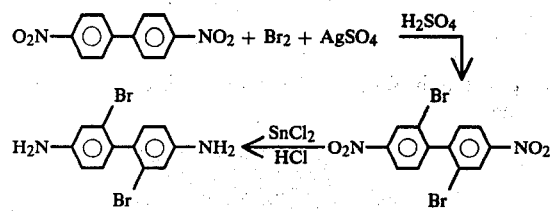

The reactant 2,2'-dibromo-4,4'-biphenylene dicarbonyl chloride (utilized in the production of the polyamides of EXAMPLES 3 and 4 hereof) can be prepared from dimethyl 4,4'-biphenylene dicarboxylate by an The reactants 2,2'-dinitro-4,4'-biphenyl dicarbonyl chloride and 2,2'-dinitrobenzidine (each utilized in the production of the polyamide of EXAMPLE 2 hereof) can be prepared from the methyl ester of 3-nitro-4-bromo-benzoic acid via a coupling reaction. The methyl ester of 3-nitro-4-bromo-benzoic acid is coupled with the aid of copper in the presence of dimethylformamide with provision of dimethyl 2,2'-dinitro-4,4'-biphenylene dicarboxylate. Acid hydrolysis yields the corresponding diacid compound 2,2'-dinitro-4,4'-biphenylene dicarboxylic acid. The diacid compound can be reacted with thionyl chloride (for conversion to 2,2'-dinitro-4,4'-biphenyl dicarbonyl chloride) or can be rearranged by the action of sodium azide and sulfuric acid (for production of 2,2'-dinitrobenzidine). These reaction schemes are illustrated as follows:

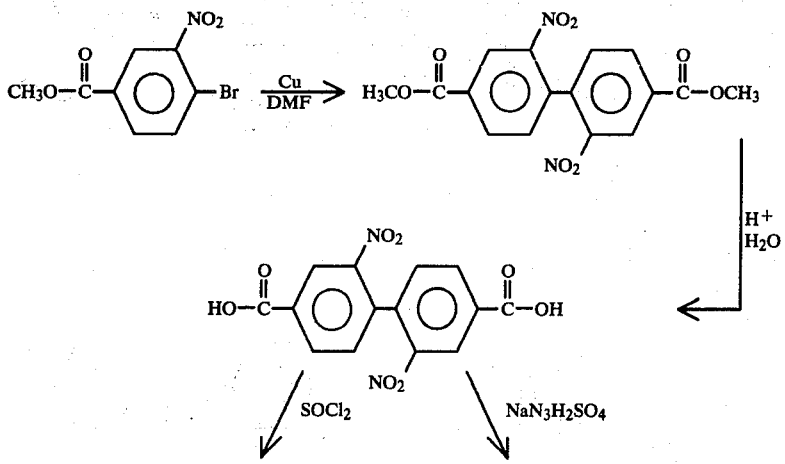

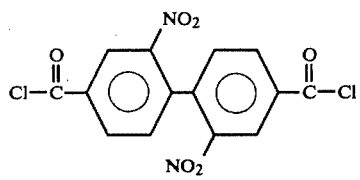

-continued

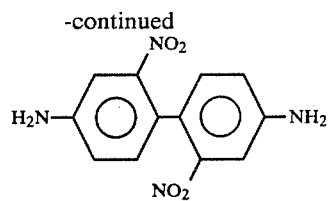

The starting compound 2,2′,3,3′,5,5′,6,6′-octa-fluoro-4,4′-biphenylene dicarbonyl chloride (utilized in the production of the polyamides of EXAMPLES 5 and 6 hereof) can be prepared by reaction of 4,4′-dibromo-2,2′,3,3′,5,5′,6,6′-octafluorobiphenyl with butyl lithium in hexane followed by reaction with carbon dioxide and reaction of the resulting octafluoro biphenylene dicarboxylic acid with thionyl chloride in accordance with the following scheme:

be prepared from p,p′-stilbene dicarboxylic acid by reaction with thionyl chloride, formation of the dimethyl ester by reaction with methanol and bromination of the resulting dimethyl ester. Reaction of the product with potassium hydroxide in alcohol yields the cis-α-bromo-dimethyl ester of stilbene dicarboxylic acid, which upon irradiation, is converted to the trans-isomer. Acid hydrolysis followed by reaction with thionyl chloride provides the desired reactant. The syn-

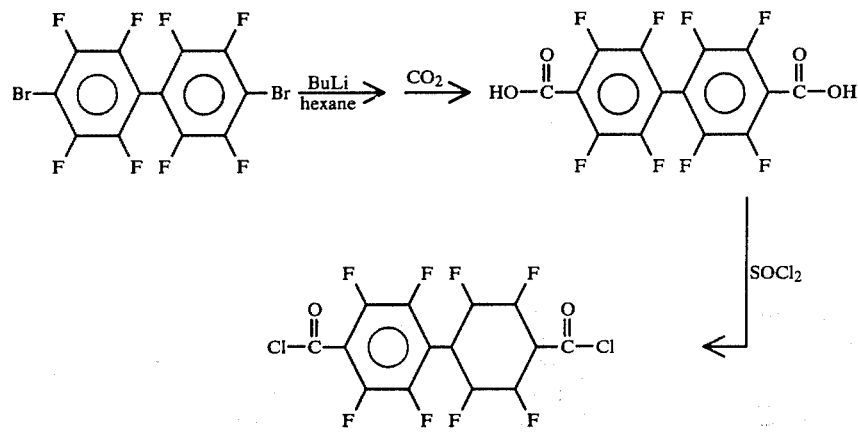

The substituted-stilbene starting material α-bromo-p,p′-stilbene dicarbonyl chloride (utilized in the manufacture of the polyamide of EXAMPLE 8 hereof) can thetic route is illustrated by the following reaction scheme:

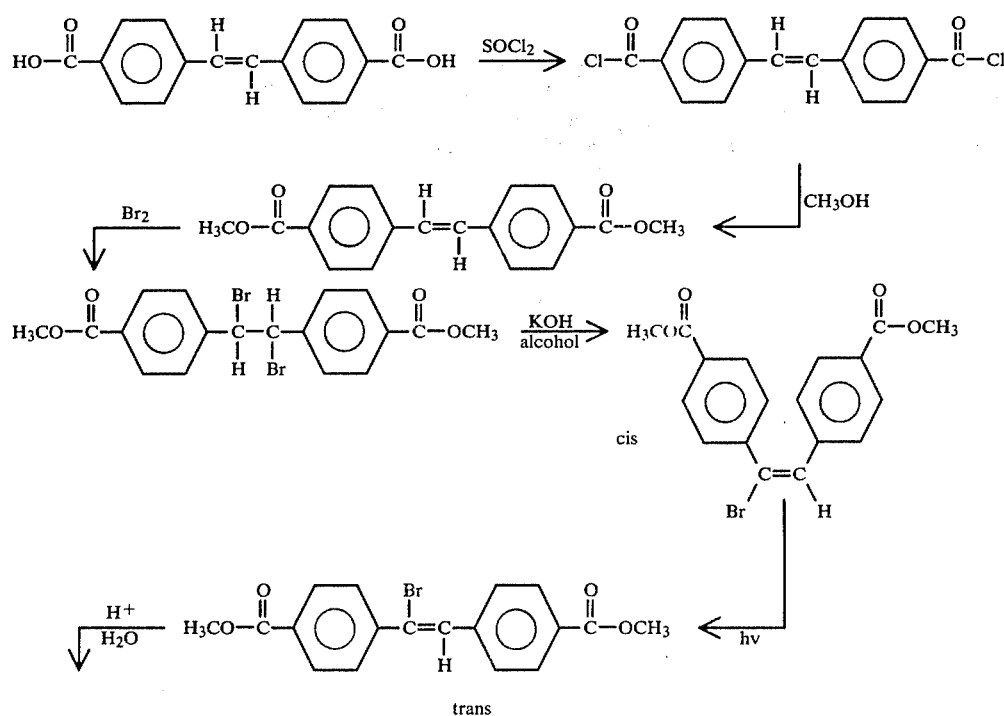

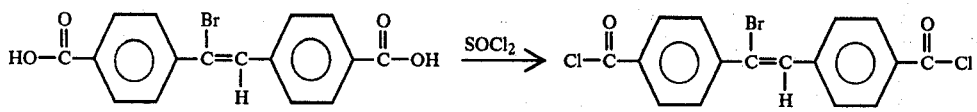

The substituted polyamides of the present invention can be variously formed or shaped into films, sheets, coatings, layers, fibrils, fibers or the like. For example, a solution of polyamide in a solvent material such as N,N-dimethylacetamide, preferably containing lithium chloride solubilizing agent, can be readily cast onto a suitable support material for the formation of a polymeric film or layer of the polyamide material. The polymeric film can be utilized for the production of a birefringent polymeric film or sheet material. Thus, the polymeric film or sheet material can be subjected to stretching so as to introduce molecular orientation and provide a film material having a highly birefringent character.

The substituted polyamides of the present invention can also be formed into fibers, fibrils or the like by extrusion or spinning methods known in the art. Thus, for example, a solution of polyamide of the present invention in a solution such as N,N-dimethylacetamide containing lithium chloride can be extruded or spun into a coagulating bath for coagulation of the polymeric material into the form of fibers which can be cut, stretched or assembled into fiber tows or bundles as desired. The fibers, fibrils, tows or the like can be washed for removal of residual solubilizing agents, solvents, extruding or spining aids and dried to materials exhibiting birefringent properties.

The substituted polyamides of the present invention are especially advantageous from the standpoint of the provision of material exhibiting high birefringence. The substituted polyamides hereof, as prepared and in solution in a suitable reaction solvent, exist in an unoriented and non-birefringent form. The substituted polyamides respond, however, to stress and exhibit birefringent character. Thus, solutions of the substituted polyamides hereof, upon the application of slight stress, exhibit streaming birefringence, which can be observed by placement of the stressed material between crossed polarizers' and observation of the transmission of light therethrough as the result of depolarization of light by the stressed birefringent polyamide material. The property of streaming birefringence observed in this manner with the aid of crossed polarizers is not visually detected by inspection of the clear, transparent polymer solution and is to be distinguished from the stress-induced satin-like sheen or pearlescence characteristic of materials exhibiting stir opalescence. The streaming birefringence exhibited by the substituted polyamides hereof (upon the application of stress) will normally be rapidly extinguished upon relaxation of the stress. Where a molecular orientation is permanently induced in the polyamide material, as by formation of the polyamide material into an oriented sheet, fiber or other form, the polyamide will exhibit optical birefringence which can be measured in accordance with a number of known methods.

The substituted polyamides of the present invention can be effectively oriented by known shaping or forming methods. Preferably, this will be accomplished by unidirectional stretching of a polymeric film, by extrusion of the polymer into a sheet, fiber, fibril or other stretched form, or by the combined effects of extrusion and stretching. In their oriented state, the polymers of the present invention exhibit unusually high birefringence. In general, greater birefringence will be observed in the case of polymeric materials exhibiting a greater degree of molecular orientation. It will be appreciated, however, as has been pointed out, hereinbefore, that the particular structure of the polyamide may affect the physical attributes of the polymer material or otherwise impose a practical limitation upon the degree of orientation that can be realized by stretching or other means. It is a significant aspect of the present invention, however, that the substituted polyamides hereof, particularly for a given degree of orientation, exhibit unusually high birefringence. In this connection, it is to be noted that the substituted polyamides hereof will often exhibit higher birefringence than more highly oriented materials of different polymeric structure. For example, an extruded film of a substituted polyamide hereof comprised of recurring units of the formula

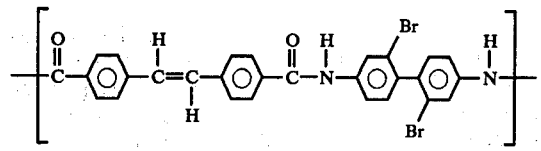

and having a degree of orientation in the range of from about 80% to 85% as determined from infra-red dichroism, exhibited a birefringence (Δn) of 0.865 as measured utilizing principles of interferometry. In contrast, a polyamide fiber material and comprised of recurring units of the formula

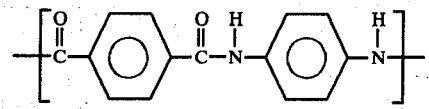

is reported in the literature, A. A. Hamza and J. Sikorski, J. Microscopy, 113, 15 (1978), as having a birefringence of 0.761, as measured by interferometric technique and at a degree of orientation of about 90% to 95%.

The substituted polyamides of the present invention, in addition to exhibiting high birefringent properties, are advantageous from the standpoint of their utilization for the production of transparent polymeric forms. In contrast to polymeric materials which become decidedly opaque as a result of stretching, the polyamides hereof exhibit transparency in unoriented and stretched forms. The substituted polyamides of the invention exhibit a high transparency and a low order of light scattering, exhibiting a ratio of amorphous to crystalline material of from about 10:1 to about 20:1 by weight. The polyamides of the invention are, thus, suited to optical applications where a light-transmissive, highly refractive and birefringent material is desirably utilized. Depending upon the nature of substituent moieties on the divalent radicals of the recurring units of the polyamides of the invention, colorless or nearly colorless polymeric films or fibers can also be fabricated. Where, for example, nitro-substituted biphenylene radicals are present, a yellow transparent film or fiber can be fabricated. Films, coating, fibers or other shaped forms of the substituted polyamides can be redissolved and reshaped or refabricated if desired. Depending upon the nature of particular recurring units of the polyamide materials, and particularly the nature of substituent moieties and solvent materials, the solubility characteristics of the substituted polyamides of the invention can be varied or controlled to suit particular applications.

The birefringent property of the polymers of the present invention can be determined by the measurement of physical and optical parameters in accordance with known principles of physics and optics. Thus, for example, the birefringence ($\Delta n$) of a substituted polyamide material of the invention can be determined by the measurement of optical phase retardation (R) and film thickness (d) and calculation of birefringence in accordance with the relationship $$\Delta n = (R\lambda/d)$$

where $\lambda$ represents the wavelength of light utilized for the conduct of the measurements. Alternatively, parallel refractive index and perpendicular refractive index of the film material can be measured utilizing Becke line analysis or critical angle measurement.

A preferred method for determining the birefringence of the substituted polyamides of the invention involves the measurement of retardation of the polyamide material by a method utilizing principles of polarized-light microscopy and interferometry. Such method provides desired precision and accuracy in the measurement of the phase difference between a sample ray passing through a sample of polyamide material and a reference ray passing through a neighboring empty area (embedding medium or air) of the same thickness. The light emitted by a low-voltage lamp of a microscope is linearly polarized by passage through a polarizer and, in turn, is passed through a condenser, a calcite plate beam splitter, a half-wave retarder plate, the polymeric sample, a beam recombinator calcite plate, and through an analyzer whose transmission direction is vertical to that of the polarizer (crossed position). In the analyzer the components vibrating in its absorption direction are extinguished, whereas the components of both rays in the transmission direction are transmitted and interfere. The phase difference between sample and reference beams, caused by the molecular between sample and reference beams, caused by the molecular structure of configuration of the polymeric sample, is measured with compensators. From these measurements, the thickness and refractive index of the polymeric material can be determined. By determining index of refraction of the polymeric sample for both parallel and perpendicular directions, birefringence can, by difference, be determined. A suitable method and apparatus for determining phase retardation, index of refraction and birefringence for the substituted polyamides of the present invention is a pol-interference device according to Jamin-Lebedeff described in greater detail by W. J. Patzelt, "Polarized-light Microscopy", Ernest Leitz GmbH, Wetzlar, West Germany, 1974, page 92.

The substituted polyamides of the present invention can be utilized in the construction of a variety of optical filter or other devices. Suitable devices include multilayer devices which include, for example, a layer of molecularly oriented and birefringent polymeric material and, in addition, at least one other layer of isotropic or birefringent material. The additional layer or layers or such devices, whether isotropic or birefringent, will generally comprise materials having an index of refraction matching substantially one index of refraction of the highly birefringent polymeric material of the invention. For example, a layer of isotropic material having an index of refraction matching substantially one index of refraction of the highly birefringent layer can be suitably bonded to the layer of highly birefringent polymer. A preferred device comprises a layer of the molecularly oriented and highly birefringent material of the invention bonded between two layers of isotropic material, the index of refraction of each isotropic layer constituting substantially a match with an index of refraction of the molecularly oriented and highly birefringent material. Such a preferred device can be utilized for the polarization of light and may be termed a "total transmission" light polarizer, i.e., one which is particularly adapted to polarize a very large portion of incident light. Total polarizers find application in equipment such as may be employed for signaling, projection and display purposes, or the like, and in antiglare systems for automotive vehicles.

According to another application of the polymeric materials of the present invention, a plurality of alternating isotropic and birefringent layers can be utilized for the production of a multilayer light polarizing device, at least one of the layers of birefringent material comprising a molecularly oriented and highly birefringent material as defined herein. Such a device can be utilized as a multilayer polarizer which partly transmits and partly reflects incident light as separate linearly polarized components vibrating in orthogonal directions.

Optical devices in which the substituted polyamides of the invention can be utilized, and their methods for construction and modes of operation are described in detail in the copending U.S. patent application of H. G. Rogers, et al., Ser. No. 238,054, filed Mar. 2, 1981. Examples of other devices which can be adapted to include a polymeric and highly birefringent layer as described herein are described, for example, in U.S. Pat. No. 3,506,333 (issued Apr. 14, 1970 to E. H. Land;) in U.S. Pat. No. 3,213,753 (issued Oct. 26, 1965 to H. G. Rogers); in U.S. Pat. No. 3,610,729 (issued Oct. 5, 1971 to H. G. Rogers); in U.S. Pat. No. 3,473,013 (issued Oct. 14, 1969 to H. G. Rogers); in U.S. Pat. No. 3,522,984 (issued Aug. 4, 1970 to H. G. Rogers); in U.S. Pat. No. 3,522,985 (issued Aug. 4, 1970 to H. G. Rogers); in U.S. Pat. No. 3,528,723 (issued Sept. 15, 1970 to H. G. Rogers); and in U.S. Pat. No. 3,582,424 (issued June 1, 1971 to K. Norvaisa).

The following non-limiting examples are illustrative of the present invention.

EXAMPLE 1

This example illustrates the preparation of poly (2,2'-dibromo-4,4'-biphenylene)-p,p'-biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.63 grams of anhydrous lithium chloride and 0.5746 gram (0.001679 mole) of sublimed 2,2'-dibromobenzidine were added while maintaining a positive nitrogen pressure. The reaction vessel was fitted with a thermometer and a rubber stopple (a rubber membrane-like sealing lid capable of receiving a syringe and of sealing itself upon removal of the syringe). Ten mls. of anhydrous distilled N-methylpyrrolidone (NMP) and 15 mls. of anydrous distilled tetramethylurea (TMU) were carefully added with the aid of syringes. The resulting mixture was stirred and warmed to 40° C. until all solids had dissolved. The solution was then cooled in a bath of ice and salt to a temperature of $-5°$ C. A small amount of lithium chloride precipitation was observed. Recrystallized p,p'-biphenylene dicarbonyl chloride (0.4689 gram; 0.001679 mole) was quickly added by means of a funnel to the stirred 2,2'-dibromobenzidine solution. An additional five mls. of TMU were added through the funnel to the reaction mixture. The temperature of the reaction mixture did not rise above a temperature of 7° C. After stirring for 60 minutes, the reaction mixture began to thicken and streaming birefringence (but not stir opalescence) was observed.

The ice bath was removed from the reaction vessel and the temperature was observed to rise to 20° C. in 30 minutes at which point the reaction solution became milky in appearance. The reaction vessel was placed in an oil bath (40° C.) and the reaction mixture was warmed for 30 minutes. The reaction mixture became clear. The temperature of the reaction mixture rose during the warming to a maximum temperature of 55° C. at which temperature the reaction mixture was stirred for one hour. The reaction product, a 3% wt./vol. polymer solution (three grams of polymer per 100 mls. of reaction solvent) was cooled to 40° C. and poured into 200 mls. of ice-water in a blender. The resulting fibrous solid was filtered and wahsed (in the blender) twice each with water, acetone and ether. The product was dried in a vacuum over at 15 mm. pressure and 90° C. for 18 hours. The product, obtained in 95.4% yield, was a white fibrous polymeric material having the following recurring structural units:

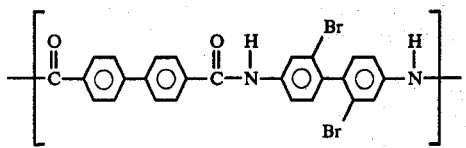

The inherent viscosity of a polymer solution (0.5 gram of the polymer of Example 1 per 100 mls. of a solution of five grams lithium chloride per 100 mls. of dimethylacetamide was 3.54 dl./gram at 30° C.

Molecular structure was confirmed by infrared spectroscopy. Inspection of the ultraviolet/visible absorption spectrum for the polymer of Example 1 (in 5% wt./vol. lithium chloride/dimethylacetamide showed a $\lambda_{max}$ of 320($\epsilon$=75,000).

Elemental analysis for $C_{26}H_{16}Br_2N_2O_2$ provided the following:

|  | % C | % H | % Br | % N | % O |
|---|---|---|---|---|---|
| Calculated: | 56.97 | 2.92 | 29.16 | 5.11 | 5.84 |
| Found: | 56.86 | 3.25 | 28.72 | 5.10 | 6.07 (by difference) |

Polymeric films were prepared from the polymeric material of Example 1 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 0.5 to 5% wt./vol., i.e., from 0.5 gram to five grams polymer per 100 mls. of the lithium chloride/dimethylacetamide solution. In each instance, the glass plate carrying the puddle-cast polymer solution was immersed in water (after minimal evaporation of solvent). The polymer film was observed to gel and a transparent and colorless unoriented film separated from the glass plate. The resulting film was soaked for several hours in water to effect extraction of occluded lithium chloride and solvent, soaked in acetone and dired in a vacuum oven at 90° C. and 15 mm. pressure. Refractive index, measured by interferometry, was 1.93.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 50% elongation, to effect film orientation. The resulting films were optically transparent. Birefringence, measured with the aid of a quartz wedge, was 0.293.

EXAMPLE 2

This example illustrates the preparation of poly (2,2'-dinitro-4,4'-biphenylene)-o,o'-dinitro-p,p'-biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.4799 gram (0.001750 mole) of recrystallized 2,2'-dinitrobenzidine yellow crystals were added while maintaining a positive nitrogen pressure. The reaction vessel was fitted with a thermometer and a rubber stopple and 30 mls. of anhydrous distilled N-methylpyrrolidone (NMP) and 20 mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temerature of $-5°$ C. Recrystallized colorless 2,2'-dinitro-4,4'-biphenyl dicarbonyl chloride (0.6460 gram; 0.00175 mole) was quickly added by means of a funnel to the stirred 2,2'-dinitrobenzidine solution. An additional three mls. of NMP were added through the funnel to the reaction mixture. The temperature of the reaction mixture did not rise above a temperature of 0° C. After stirring for 30 minutes, there was no noticeable change in reaction mixture viscosity.

The ice bath was removed from the reaction vessel and the temperature was observed to rise to 20° C. in 30 minutes at which point the reaction solution was heated in stages up to 90° C. over a period of 2.5 hours.

The reaction product, a 3% wt./vol. polymer solution (three grams of polymer per 100 mls. of reaction solvent) was cooled to 40° C. and poured into 200 mls. of ice-water in a blender. The resulting gelatinous solid was filtered and washed (in the blender) twice each with water, acetone and ether. The product was dried in a vacuum oven at 15 mm. pressure and 90° C. for 18 hours. The polymeric product, obtained in 88% yield, was a dark-yellow powder having the following recurring structural units:

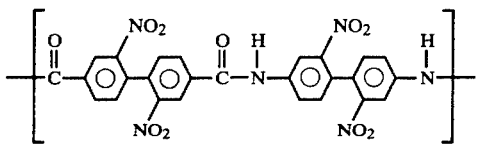

The inherent viscosity of a polymer solution (0.5 grams of the polymer of Example 2 per 100 mls. of a solution of five grams lithium chloride per 100 mls. of dimethylacetamide) was 1.40 dl./gram at 30° C.

Molecular structure was confirmed by infrared spectroscopy. Inspection of the ultraviolet/visible absorption spectrum for the polymer of Example 2 (in 5% wt./vol. lithium chloride/dimethylacetamide) showed a $\lambda_{max}$ of 307 nm ($\epsilon = 38,400$) and an absorption peak at 365 nm ($\epsilon = 3,000$).

Elemental analysis for $C_{26}H_{14}N_6O_{10}$ provided the following:

|  | % C | % H | % N | % O |
|---|---|---|---|---|
| Calculated: | 54.74 | 2.47 | 14.73 | 28.06 |
| Found | 54.24 | 2.60 | 13.91 | 29.25 (by difference) |

Thermogravimetric analysis showed that onset of degradation of the polymer of Example 2 occurred at 360° C. in nitrogen and at 300° C. in air. Differential scanning calorimetry and thermal mechanical analysis of film samples showed a reproducible transition at about 190° C.

Polymeric films were prepared from the polymeric material of Example 2 by casting (onto glass plates) a solution of the polymeric material in a 5% wt./vol. solution of lithium chloride and dimethylacetamide (five grams lithium chloride per 100 mls. of dimethylacetamide). The concentration of polymer was 5% wt./vol., i.e., five grams polymer per 100 mls. of the lithium chloride/dimethylacetamide solution. In each instance, the glass plate carrying the puddle-cast polymer solution was immersed in water (after most of the solvent had evaporated). The polymer film was observed to gel and a transparent, yellow unoriented film separated from the glass plate. The resulting film was soaked for several hours in water to effect extraction of occluded lithium chloride and solvent.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in boiling ethylene glycol) to about 60% elongation, to effect film orientation. The resulting polymeric strips were optically transparent. Birefringence, measured with the aid of a quartz wedge, and by index matching, was 0.33. The calculated isotropic refractive index was 1.75. Wide-angle X-ray analysis of the birefringent films showed crystallinity to be less than 10% by weight.

EXAMPLE 3

This example illustrates the preparation of poly (2,2'-dibromo-4,4'-biphenylene)-o,o'-dibromo-p,p'-biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 2.0 grams of anhydrous lithium chloride and 0.7828 gram (0.002289 mole) of sublimed 2,2'-dibromobenzidine were added while maintaining a positive nitrogen pressure. The reaction vessel was fitted with a thermometer and a rubber stopple and 20 mls. of anhydrous distilled N-methylpyrrolidone (NMP) and 35 mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of 0° C. Recrystallized 2,2'-dibromo-4,4'-biphenylene dicarbonyl chloride (1.0000 gram; 0.002289 mole) was quickly added by means of a funnel to the stirred 2,2'-dibromobenzidine solution. An additional five mls. of TMU, at a temperature of 25° C., were added through the funnel to the reaction mixture. The temperature of the reaction mixture rose to 15° C. and then dropped to 4° C. After stirring for 15 minutes, the reaction mixture began to thicken and streaming birefringence (but not stir opalescence) was observed. Stirring was continued for an additional 30 minutes at 7° C. and the ice bath was removed from the reaction vessel. The temperature of the reaction mixture rose to 25° C. (in 90 minutes) and the reaction mixture was then slowly heated to 100° C. over a two-hour period.

The reaction product, a 4% wt./vol. polymer solution (four grams of polymer per 100 mls of reaction solvent) was cooled to 40° C. and poured into 200 mls. of ice-water in a blender. The resulting fibrous solid was filtered and washed (in the blender) twice each with water, acetone and ether. The product was dried in a vacuum over at 15 mm. pressure and 90° C. for 18 hours. The product, obtained in 96.6% yield, was a white fibrous polymeric material having the following recurring structural units:

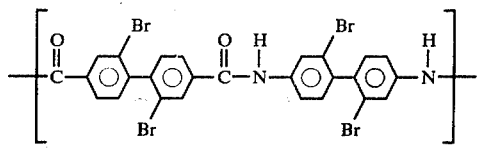

The inherent viscosity of a polymer solution (0.5 grams of the polymer of Example 3 per 100 mls. of a solution of five grams lithium chloride per 100 mls. of dimethylacetamide) was 2.04 dl./gram at 30° C. Molecular weight determination based on light scattering, indicated $2.72 \times 10^5$, and by gel permeation chromatography, a molecular weight of $5.66 \times 10^4$. Molecular structure was confirmed by infrared spectroscopy. Inspection of the ultraviolet/visible absorption spectrum for the polymer of Example 3 (in 5% wt./vol. lithium chloride/dimethylacetamide) showed a $\lambda_{max}$ of 305 nm ($\epsilon = 31,900$) and no absorption above 380 nm.

Elemental analysis for $C_{26}H_{14}Br_4N_2O_2$ provided the following:

|             | % C   | % H  | % Br  | % N  | % O              |
|-------------|-------|------|-------|------|------------------|
| Calculated: | 44.23 | 1.99 | 45.27 | 3.99 | 4.52             |
| Found:      | 44.54 | 2.19 | 45.25 | 3.87 | 4.15 (by difference) |

Thermogravimetric analysis showed that onset of degradation of the polymer of Example 3 occurred at 530° C. in nitrogen. Thermal mechanical analysis of film samples showed a reproducible transition at about 120° C.

Polymeric films were prepared from the polymeric material of Example 3 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 0.5 to 5% wt./vol., i.e., from 0.5 gram to 5 grams polymer per 100 mls. of the lithium chloride/dimethylacetamide solution. In each instance, the glass plate carrying the puddle-cast polymer solution was immersed in water (after most of the solvent had evaporated). The polymer film was observed to gel and a transparent, colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.84.

Stretched polymeric films were prepared in the following manner. Water-swollen films (obtained by soaking the polymer films for several hours for removal of occluded lithium chloride and solvent as aforedescribed) were cut into strips. The strips were mounted for stretching between the jaws of a mechanical unidirectional stretcher. Strips were stretched, in some instances, in air at 220° C. and, in other instances, in boiling ethylene glycol. Elongation ranged from 60% to 65%. Infrared dichroism indicated that the films were less than 65% oriented. The films were optically transparent. Birefringence, measured with the aid of a quartz wedge, was 0.390. Wide-angle X-ray analysis of the birefringent polymer films showed them to be less than 10% by weight crystalline.

EXAMPLE 4

This example illustrates the preparation of poly (2,2'-dichloro-5,5'-dimethoxy-biphenylene)-o,o'-dibromo-p,p'-biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.6519 gram (0.002082 mole) of sublimed 2,2'-dichloro-5,5'-dimethoxybenzidine were added while maintaining a positive nitrogen pressure. The reaction vessel was fitted with a thermometer and a rubber stopple and ten mls. of anhydrous distilled N-methylpyrrolidone (NMP) and ten mls. of anhydrous distilled tetramethylurea (TMU) were carefully added with the aid of syringes. The resulting mixture was stirred and warmed to 40° C. until all solids had dissolved. The resulting orange solution was then cooled in a bath of ice and salt to a temperature of 0° C. A small amount of lithium chloride precipitation was observed. Recrystallized 2,2'-dibromo-4,4'-biphenyldicarbonyl chloride (0.9095 gram; 0.002082 mole) was quickly added by means of a funnel to the stirred 2,2'-dichloro-5,5'-dimethoxybenzidine solution. An additional ten mls. of TMU (at a temperature of 25° C.) were added through the funnel to the reaction mixture. The temperature of the reaction mixture did not rise above a temperature of 0° C. After stirring for 30 minutes, the formation of a gelatinous, light-yellow, transparent mass (which exhibited streaming birefringence but not stir opalescence) was observed. Stirring was continued for an additional ten minutes at 8° C., the stirring was stopped and the ice bath was removed. The temperature of the reaction mass was observed to rise to 25° C. in 15 minutes, and the gel became stiffer in consistency. Heating was immediately commenced and an additional 20 mls. of TMU were added to facilitate dissolution of the reaction mass. Within 60 minutes the temperature rose to 90° C. and the gel melted to provide a homogeneous, viscous solution. Heating at 90° C. was continued for two hours while stirring vigorously.

The reaction product, a 2.82% wt./vol. light-yellow polymer solution (2.82 grams of polymer per 100 mls. of reaction solvent) was cooled to 40° C. and the resulting gelatinous, transparent mass was added to 200 mls. of ice-water in a blender. The resulting rubbery solid was filtered and washed (in the blender) twice each with water, acetone and ether. The product was dried in a vacuum oven at 15 mm. pressure and 90° C. for 18 hours. The product, obtained in 99.3% yield, was a very pale-yellow fibrous polymeric material having the following recurring structural units:

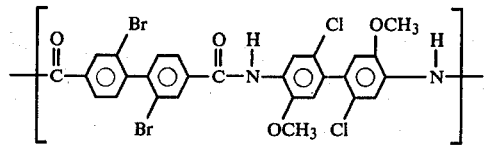

The inherent viscosity of a polymer solution (0.5 gram of the polymer of Example 4 per 100 mls. of a solution of five grams lithium chloride per 100 mls. of dimethylacetamide) was 5.75 dl./gram at 30° C.

Molecular structure was confirmed by infrared spectroscopy. Elemental analysis for $C_{28}H_{18}Br_2Cl_2N_2O_4$ provided the following:

|             | % C   | % H  | % Br  | % Cl  | % N  | % O  |
|-------------|-------|------|-------|-------|------|------|
| Calculated: | 49.66 | 2.68 | 23.60 | 10.47 | 4.14 | 9.45 |
| Found:      | 49.05 | 2.95 | 23.07 | —     | 4.15 | —    |

Polymeric films were prepared from the polymeric material of Example 4 by casting (onto glass plates) solutions of the polymeric material in a 5% wt./vol. solution of lithium chloride and dimethylacetamide (five gms. lithium chloride per 100 mls. of dimethylacetamide). The concentration of polymer was 2% wt./vol., i.e., two grams of polymer per 100 mls. of the lithium chloride/dimethylacetamide solution. In each instance, the glass plate carrying the puddle-cast polymer solution was immersed in water (after minimal evaporation of solvent. The polymer film was observed to gel and a transparent, colorless unoriented film separated from the glass plate. The resulting film was soaked for two days in water to effect extraction of occluded lithium chloride and solvent, soaked in acetone and dried in a vacuum oven at 90° C. and 15 mm. pressure. Refractive index, measured by interferometry was 1.87.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 50% elongation, to effect film orientation. The stretched films were optically transparent. Birefringence, measured with the aid of a quartz wedge, was 0.24.

Solutions of the polymer of Example 4, in a concentration of 3 to 5% wt./vol., in lithium chloride-containing solvents (e.g., dimethylacetamide containing lithium chloride) were found to form colorless, transparent gels which could be melted and resolidified without thermal degradation. When the molten solutions were poured into molds or cast into films, solidification was rapid and the solid pieces or films were readily removable. The resulting rubbery solids exhibited high birefringence upon application of very slight stress. Removal of the stress was accompanied by instantaneous disappearance of the birefringent property.

EXAMPLE 5

This example illustrates the preparation of poly (2,2'-dibromo-4,4'-biphenylene)-octafluoro-p,p'- biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.4571 gram (0.001338 mole) of sublimed 2,2'-dibromobenzidine were added while maintaining a positive nitrogen pressure. The reaction vessel was fitted with a thermometer and a rubber stopple and ten mls. of anhydrous distilled N-methylpyrrolidone (NMP) and ten mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of 0° C. A small amount of lithium chloride precipitation was observed. Distilled 2,2',3,3',5,5',6,6'-octafluoro-4,4'-biphenylene dicarbonyl chloride (0.5660 gram; 0.001338 mole) was quickly added by means of a funnel to the stirred, 2,2'-dibromobenzidine solution. An additional ten mls. of TMU (at a temperature of 25° C.) were added through the funnel to the reaction mixture. The temperature of the reaction mixture did not rise above a temperature of 2° C. After stirring for 15 minutes, the reaction mixture began to thicken and streaming birefringence (but not stir opalescence) was observed. Stirring was continued for an additional 30 minutes at 4° C. and the ice bath was removed. The temperature of the reaction mixture was observed to rise to 25° C. in 40 minutes at which point the reaction solution was slightly viscous and cloudy in appearance. The reaction mixture was warmed gently for 90 minutes with stirring. The temperature of the reaction mixture rose during the warming to a maximum temperature of 45° C. at which temperature the reaction solution became homogeneous. Stirring was continued for 18 hours at 45° C.

The resulting reaction product, a 3% wt./vol. polymer solution (three grams of polymer per 100 mls. of reaction solvent) was cooled to 40° C. and poured into 200 mls. of ice-water in a blender. The resulting fibrous solid was filtered and washed (in the blender) twice each with water, acetone and ether. The product was dried in a vacuum oven at 15 mm. pressure and 90° C. for 18 hours. The product, obtained in 87.6% yield, was a white fibrous polymeric material having the following recurring structural units:

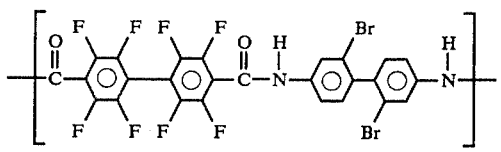

The inherent viscosity of a polymer solution (0.5 gram of the polymer of Example 5 per 100 mls. of a solution of five grams lithium chloride per 100 mls. of dimethylacetamide) was 1.68 dl./gram at 30° C.

Molecular structure was confirmed by infrared spectroscopy. Inspection of the ultraviolet/visible absorption spectrum for the polymer of Example 5 (in 5% wt./vol. lithium chloride/dimethylacetamide) showed a $\lambda_{max}$ of 340 nm and an absorption peak at 360 nm ($\epsilon = 306$).

Elemental analysis for $C_{26}H_8Br_2F_8N_2O_2$ provided the following:

|  | % C | % H | % Br | % F | % N | % O |
|---|---|---|---|---|---|---|
| Calculated: | 45.11 | 1.17 | 23.09 | 21.97 | 4.05 | 4.61 |
| Found: | 42.89 | 1.17 | 21.86 | 20.81 | 3.76 | 9.51 (by difference) |

Thermogravimetric analysis showed that onset of degradation of the polymer of Example 5 occurred at 325° C. in nitrogen and at 350° C. in air. Differential scanning calorimetry showed a reproducible transition at about 155° C.

Polymeric films were prepared from the polymeric material of Example 5 by casting (onto glass plates) solutions of the polymeric material in a 2% wt./vol. solution of lithium chloride and dimethylacetamide (two grams lithium chloride per 100 mls. of dimethylacetamide). The concentration of polymer ranged from 0.5 to 5% wt./vol., i.e., from 0.5 gram to five grams polymer per 100 mls. of the lithium chloride/dimethylacetamide solution. In each instance, the glass plate carrying the puddle-cast polymer solution was immersed in water (after minimal evaporation of solvent). The polymer was observed to gel and a transparent and colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry was 1.74.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were oriented by stretching (in air at 200° C.) to an elongation in the range of 50 to 55%. The polymeric strips were optically transparent. Birefringence, measured with the aid of a quartz wedge, was 0.35. Strips were also stretched in methanol at 25° C. to an elongation of 55%. Measurement of birefringence for such stretched films showed a birefringence of 0.44.

EXAMPLE 6

This example illustrates the preparation of poly (2,2',3,3',4,4',6,6'-octafluoro-4,4'-biphenylene)carbohydrazide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.15 grams of anhydrous lithium chloride and 0.0386 gram (0.001205 mole) of distilled hydrazine were added while maintaining a positive nitrogen pressure. The reaction vessel was fitted with a thermometer and a rubber stopple and seven mls. of anhydrous distilled N-methylpyrrolidone (NMP) and 12 mls. of anhydrous distilled tetramethylurea (TMU) were carefully added with the aid of syringes. The resulting mixture was stirred until most of the lithium chloride had dissolved. The solution was then cooled in a bath of ice and salt to a temperature of 0° C. A small amount of lithium chloride precipitation was observed. Distilled 2,2',3,3',5,5',6,6'-octafluoro-4,4'-biphenylene dicarbonyl chloride (0.5100 gram; 0.001205 mole) was quickly added by means of a funnel to the stirred hydrazine solution. An additional four mls. of TMU (at a temperature of 25° C.) were added through the funnel to the reaction mixture. The temperature of the reaction mixture did not rise above a temperature of 5° C. The reaction mixture did not thicken and steaming birefringence was not observed. Lithium carbonate (0.0890 gram; 0.0024 mole) was added to the reaction mixture, stirring was continued for 30 minutes at 4° C. and the ice bath was removed. As the temperature of the reaction mixture rose to 25° C. during the subsequent 60 minutes, the reaction solution first became cloudy and, then, a white precipitate formed. Over the next 30 minutes, the reaction mixture was warmed to 40° C. at which time the reaction mixture became homogeneous. The reaction temperature was raised to 70° C. and maintained for one hour. No increase in viscosity was apparent.

The reaction product, a 1.99% wt./vol. polymer solution (1.99 grams of polymer per 100 mls. of reaction solvent) was cooled to 40° C. and poured into 200 mls. of ice-water in a blender. The resulting powdery solid was filtered and washed (in the blender) twice each with water, acetone and ether. The product was dried in a vacuum oven at 15 mm. pressure and 90° C. for 18 hours. The polymeric product, obtained in 95.4% yield, was a white solid material having the following recurring structural units:

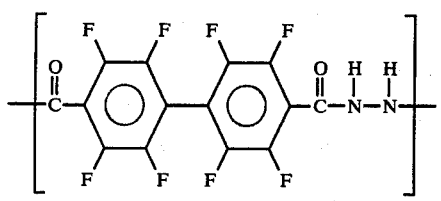

The inherent viscosity of a polymer solution (0.5 gram of the polymer of Example 6 per 100 mls. of a solution of five grams lithium chloride per 100 mls. of dimethylacetamide) was 1.16 dl./gram at 30° C. The molecular structure of the polymer of Example 6 was confirmed by infrared spectroscopy.

Polymeric films were prepared from the polymeric material of Example 6 by casting (onto glass plates) solutions of the polymeric material in a 2% wt./vol. solution of lithium chloride and dimethylacetamide (two grams lithium chloride per 100 mls. of dimethylacetamide). The concentration of polymer ranged from 0.5 to 5% wt./vol., i.e., from 0.5 gram to five grams polymer per 100 mls. of the lithium chloride/dimethylacetamide solution. In each instance, the glass plate carrying the puddle cast polymer solution was immersed in water (after evaporating the solvent for one hour). The polymer film was observed to gel, and a physically weak, cloudy and colorless film separated from the glass plate. The resulting film was soaked for several hours in water to effect extraction of occluded lithium chloride and solvent, soaked in acetone and dried in a vacuum oven at 90° C. and 15 mm. pressure. The films were not of sufficient strength to undergo stretching. Refractive index, measured by interferometry, was 1.60.

EXAMPLE 7

This example illustrates the preparation of poly (2,2'-dibromo-4,4'-biphenylene)-trans-p,p'-stilbene dicarboxamide and the preparation therefrom of birefringent polymeric films.

A 250-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 4.88 grams of anhydrous lithium chloride and 2.1441 grams (0.006269 mole) of sublimed 2,2'-dibromobenzidine were added while maintaining a positive nitrogen pressure. The reaction vessel was fitted with a thermometer and a rubber stopple and 45 mls. of anhydrous distilled N-methylpyrrolidone (NMP) and 45 mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of −5° C. A small amount of lithium chloride precipitation was observed. Recrystallized trans-p,p'-stilbene dicarbonyl chloride (1.9129 grams; 0.006269 mole) was quickly added by means of a funnel to the stirred 2,2'-dibromobenzidine solution. An additional 30 mls. of NMP/TMU mixture (1:1 by weight), at a temperature of 25° C., were added through the funnel to the reaction mixture. The temperature of the reaction mixture did not rise above a temperature of 5° C. and then dropped rapidly to −3° C. After stirring for 30 minutes, the reaction mixture began to thicken and streaming birefringence (but not stir opalescence) was observed. Lithium carbonate (0.926 gram, 0.01254 mole) was added and stirring was continued for an additional 30 minutes at 0° C.

The ice bath was removed from the reaction vessel, and when the temperature reached 20° C. (in 30 minutes), the reaction solution had become sufficiently viscous as to begin to climb the shaft of the mechanical stirrer. A maximum reaction temperature of 55° C. was reached. Stirring was stopped and the mixture was heated overnight at a temperature of 55° C. The reaction product, a viscous polymer solution of 3% wt./vol. concentration (three grams of polymer per 100 mls. of reaction solvent) was diluted with 130 mls. of 2% wt./vol. lithium chloride in dimethylacetamide. The resulting polymer solution was poured into 200 mls. of ice and water in a blender. The resulting fibrous solid was filtered and washed (in the blender) twice each with water, acetone and ether. The product was dried in a vacuum oven at 15 mm. pressure and 90° C. for 18 hours. The polymeric product, obtained in 100% yield, was a very light-yellow fibrous solid having the following recurring structural units:

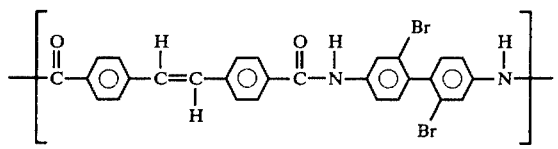

The inherent viscosity of a polymer solution (0.5 gram of the polymer of Example 7 per 100 mls. of a solution of five grams lithium chloride per 100 mls. of dimethylacetamide) was 9.04 dl./gram at 30° C. The molecular weight of the polymer, as determined by light scatterings, was $1.95 \times 10^6$, and be gel permeation chromatography, $8.71 \times 10^5$.

The molecular structure of the polymer was confirmed by infrared spectroscopy. Inspection of the ultraviolet/visible spectrum of the polymer (in 5% wt./vol. lithium chloride/dimethylacetamide) showed a $\lambda_{max}$ of 352 nm ($\epsilon = 66,000$); an absorption peak at 368 nm ($\epsilon = 52,800$) and an extremely weak tail at 400 nm.

Elemental analysis for $C_{28}H_{18}Br_2N_2O_2$ provided the following:

| | % C | % H | % Br | % N | % O |
|---|---|---|---|---|---|
| Calculated: | 58.56 | 3.16 | 27.83 | 4.88 | 5.57 |
| Found: | 58.50 | 3.22 | 27.94 | 4.87 | 5.47 (by difference) |

Thermogravimetric analysis showed that the onset of degradation of the polymer of Example 7 occurred at 470° C. in nitrogen and at 515° C. in air. Differential scanning calorimetry and thermal mechanical analysis of film samples detected a reproducible transition at about 225° C.

Polymeric films were prepared from the polymeric material of Example 7 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 1 to 5% wt./vol., i.e., from one gram to five grams polymer per 100 mls. of the lithium chloride/dimethylacetamide solution. In each instance, the glass plate carrying the puddle-cast polymer solution was immersed in water (after minimal evaporation of solvent). The polymer was observed to gel and a transparent and colorless unoriented film separated from the soaked glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 2.03.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 55 to 55% elongation, to effect film orientation. The stretched films were optically transparent. Infrared dichroism indicated that the stretched films were less than 65% by weight oriented; the modulus was $3.9 \times 10^6$ p.s.i. Wide-angle X-ray analysis of the films showed crystallinity to be less than 10% by weight. Birefringence, measured with the aid of a quartz wedge, was 0.589.

Solutions of the polymer of Example 7 in lithium chloride/dimethylacetamide, as aforedescribed, were formed into extruded films by the "wet-jet" method whereby the solution of polymer is extruded into an aqueous coagulation bath for gelling of the polymer material. The resulting transparent, colorless film strips were soaked in water and cut to about 1 to 2 inches (25.4 to 50.8 mm.) for testing. The partially oriented strips of film produced by the extrusion were further oriented by stretching in the manner described in the Examples hereof. Stretching was effected in air at a temperature of 180° C. Elongation was to the break point, in the range of about 40% to 50%. The stretched strips were optically transparent. Measurement of birefringence utilizing a quartz wedge provided a birefringence value of 0.977. Measurement by resort to interferometry provided a value of 0.865.

EXAMPLE 8

This example illustrates the preparation of poly (2,2'-dibromo-4,4'-biphenylene)-trans-α-bromo-biphenylene dicarboxamide and the preparation therefrom of birefringnet polymeric films.

A 50-ml. reaction vessel (a resin-making kettle equipped with a mechanical stirrer, a pressure-equalizing dropping funnel, a nitrogen inlet tube and calcium chloride drying tube) was heated while simultaneously flushing the vessel with nitrogen. After the reaction vessel had cooled to room temperature, 1.5 grams of anhydrous lithium chloride and 0.4779 gram (0.001397 mole) of sublimed 2,2'-dibromobenzidine were added while maintaining a positive nitrogen pressure. The reaction vessel was fitted with a thermometer and a rubber stopple and 15 mls. of anhydrous distilled N-methylpyrrolidinone (NMP) and five mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of 0° C. A small amount of lithium chloride precipitation was observed. Recrystallized α-bromo-p,p'-stilbene dicarbonyl chloride (0.5366 gram; 0.001397 mole) was quickly added by means of a funnel to the stirred 2,2'-dibromobenzidine solution. An additional ten mls. of TMU (at a temperature of 25° C.) were added through the funnel to the reaction mixture. The temperature of the reaction mixture did not rise above a temperature of 4° C. After stirring for 15 minutes, the reaction mixture began to thicken and streaming birefringence (but not stir opalescence) was observed. Stirring was continued for an additional 30 minutes at 4° C.

The ice bath was removed from the reaction vessel and the temperature was observed to rise to 25° C. in 90 minutes at which point the reaction mixture had become sufficiently viscous as to climb the shaft of the mechanical stirrer. Over the next 90 minutes, the very pale-yellow reaction mass was gently warmed with intermittant stirring; the maximum temperature reached was approximately 70° C.

The reaction product, a 3% wt./vol. polymer solution (three grams of polymer per 100 mls. of reaction solvent) was cooled to 40° C. and poured into 200 mls. of ice-water in a blender. The resulting fibrous solid was filtered and washed (in the blender) twice each with water, acetone and ether. The product was dried in a vacuum oven at 15 mm. pressure and 90° C. for 18 hours. The product, obtained in 95.4% yield, was a light-yellow fibrous polymeric material having the following recurring structural units:

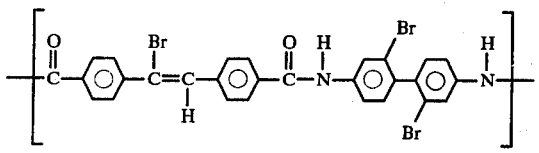

The inherent viscosity of a polymer solution (0.5 gram of the polymer of Example 8 per 100 mls. of a solution of five grams lithium chloride per 100 mls. of dimethylacetamide) was 7.81 dl./gram at 30° C.

Molecular structure was confirmed by infrared spectroscopy. Elemental analysis for $C_{28}H_{17}N_2Br_3O_2$ provided the following:

| | % C | % H | % Br | % N | % O |
|---|---|---|---|---|---|
| Calculated: | 51.478 | 2.604 | 36.724 | 4.289 | 4.90 |
| Found: | 51.17 | 2.80 | 34.82 | 4.15 | 7.06 (by difference) |

Polymeric films were prepared from the polymeric material of Example 8 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 0.5 to 5% wt./vol., i.e., from 0.5 gram to 5 grams polymer per 100 mls. of the lithium chloride/dimethylacetamide solution. In each instance, the glass plate carrying the puddle-cast polymer solution was immersed in water (after minimal evaporation of solvent). The polymer was observed to gel and a transparent and colorless unoriented film separated from the soaked glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 2.07.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 60% to 65% elongation, to effect film orientation. The stretched strips were optically transparent. Birefringence, measured with the aid of a quartz wedge, was 0.680.

Solutions of the polymer of Example 8 in lithium chloride/dimethylacetamide, as aforedescribed, were formed into extruded films by the "wet-jet" method whereby the solution of polymer is extruded into an aqueous coagulation bath for gelling of the polymer material. The resulting transparent, colorless film strips were soaked in water and cut to about 1 to 2 inches (25.4 to 50.8 mm.) for testing. The partially oriented strips of film produced by the extrusion were further oriented by stretching in the manner described in the Examples hereof. Stretching was effected in air (at a temperature of 180° C.) to the break point, in the range of about 40% to 50% elongation. The stretched film strips were optically transparent. Measurement of birefringence utilizing a quartz wedge provided a birefringence value of 0.955. Measurement by resort to interferometry provided a value of 0.849.

EXAMPLE 9

This example illustrates the preparation of poly (2,2'-dibromo-4,4'-biphenylene)-α,α'-dimethylmuconamide and the preparation therefrom of birefringent polymeric films.

A 50-ml. reaction vessel (a resin-making kettle equipped with a mechanical stirrer, a pressure-equalizing dropping funnel, a nitrogen inlet tube and calcium chloride drying tube) was heated while simultaneously flushing the vessel with nitrogen. After the reaction vessel had cooled to room temperature, 0.4 gram of anhydrous lithium chloride and 0.8519 gram (0.00249 mole) of sublimed 2,2'-dibromobenzidine were added while maintaining a positive nitrogen pressure. The reaction vessel was fitted with a thermometer and a rubber stopple and ten mls. of anhydrous distilled N-methylpyrrolidone (NMP) were carefully added with the aid of a syringe. The resulting mixture was stirred and warmed to 40° C. until all solids had dissolved. The solution was then cooled in a bath of ice and salt to a temperature of 0° C. with formation of some lithium chloride precipitate. A solution of recrystallized α,α'-dimethyl muconyl chloride (0.5157 gram; 0.002491 mole) in six mls. of anhydrous, distilled tetrahydrofuran(THF) was added to the dropping funnel through a rubber stopper with a syringe. The α,α'-dimethyl muconyl chloride/THF solution, the temperature of which was 25° C., was added dropwise over five minutes to the cold 2,2'-dibromobenzidine solution while stirring moderately. The addition funnel was rinsed with six mls. of NMP which was also added dropwise to the reaction mixture in order to prevent the temperature of the reaction mixture from rising above 1° C. After stirring for one hour, during which time the solution turned lemon-yellow (but did not thicken), 0.354 gram of solid lithium carbonate was added all at once to the reaction mixture. Within ten minutes noticeable thickening was observed, and after an additional 20 minutes, at 20° C., the viscosity increased further. The ice bath was removed from the reaction vessel and the temperature of the reaction mixture was allowed to rise to 25° C. over a one-hour period during which time a thick paste had formed. The temperature of the reaction mixture was increased to 65° C. over the next 20 minutes producing a mixture which could no longer be stirred. Additional heating for 18 hours at 55° C. without stirring produced a transparent, light-yellow viscous polymer solution. The reaction product, a 5.36% wt./vol. polymer solution (5.36 grams of polymer per 100 mls. of reaction solvent) was observed to exhibit considerable streaming birefringence upon application of low mechanical stress; stir opalescence was not, however, observed.

The polymer solution was poured into a blender containing 200 ml. of ice-water and the resulting fibrous solid was filtered and washed (in the blender) twice each with water, acetone and ether. The product was dried in a vacuum oven at 15 mm. pressure and 90° C. for 18 hours. The product, obtained in 94.7% yield, was a white fibrous polymeric material having the following recurring structural units:

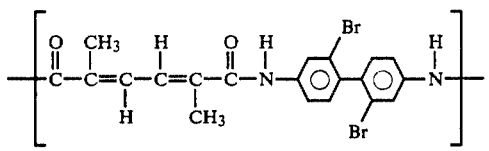

The inherent viscosity of a polymer solution (0.5 grams of the polymer of Example 9 per 100 mls. of a solution of five grams lithium chloride per 100 mls. of dimethylacetamide) was 4.69 dl./gram at 30° C.

Molecular structure was confirmed by infrared spectroscopy. Inspection of the ultraviolet/visible absorption spectrum for the polymer of Example 9 (in 3% wt./vol. lithium chloride/dimethylacetamide showed a $\lambda_{max}$ of 333 nm($\epsilon$=33,600) and an extremely weak tail at 400 nm.

Elemental analysis for $C_{20}H_{16}Br_2N_2O_2$ provided the following:

|  | % C | % H | % Br | % N | % O |
| --- | --- | --- | --- | --- | --- |
| Calculated: | 50.448 | 3.387 | 33.562 | 5.883 | 6.72 |
| Found: | 50.09 | 3.45 | 34.17 | 5.72 | 6.57 (by difference) |

Thermogravimetric analysis showed that the onset of degradation occurred at 360° C. in nitrogen and at 310° C. in air. Differential scanning calorimetry and thermal mechanical analysis of film samples showed a reproducible transition at about 185° C.

Polymeric films were prepared from the polymeric material of Example 9 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 2 to 4% wt./vol., i.e., from two grams to four grams polymer per 100 mls. of the lithium chloride/dimethylacetamide solution. In each instance, the glass plate carrying the puddle-cast polymer solution was immersed in water (after minimal evaporation of solvent). The polymer film was observed to gel and a transparent and colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.91.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical stretcher and were unidirectionally stretched, successively, in steam, acetone and boiling ethylene glycol (all of which function as plasticizers). The strips were stretched to an elongation of from 35% to 45%. The film strips were further elongated (up to 60%) by stretching in air at 200° C. The stretched strips were optically transparent. Optical retardation was measured with a calibrated quartz wedge; film thickness was measured with a micrometer. Birefringence, measured by means of a quartz wedge, was 0.40.

EXAMPLE 10

This example illustrates the preparation of poly-[2,2'-bis(trifluoromethyl)-4,4'-biphenylene]-trans-p,p'-stilbene dicarboxamide and the preparation therefrom of birefringent polymeric films.

A 100 ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.5171 gram (0.001615 mole) of recrystallized 2,2'-bis(trifluoromethyl)-benzidine were added while maintaining a positive nitrogen pressure. The reaction vessel was fitted with a thermometer and a rubber stopple and ten mls. of anhydrous distilled N-methylpyrrolidone (NMP) and ten mls. of anhydrous distilled tetramethylurea (TMU) were carefully added with the aid of syringes. The resulting mixture was stirred and warmed to 40° C. until all solids had dissolved. The solution was then cooled to a bath of ice and salt to a temperature of −5° C. A small amount of lithium chloride precipitation was observed. Recrystallized trans-p,p'-stilbene dicarbonyl chloride (0.4923 gram; 0.001615 mole) was carefully added by means of a funnel to the stirred 2,2'-bis(trifluoromethyl)-benzidine solution. An additional 10 mls. of TMU, at a temperature of 0° C., were added through the funnel to the reaction mixture. The temperature of the reaction mixture did not rise above a temperature of 5° C. and then dropped rapidly to −3° C. After stirring for 30 minutes, the reaction mixture began to thicken and streaming birefringence (but not stir opalescence) was observed. Stirring was continued for an additional 30 minutes at 0° C.

The ice bath was removed from the reaction vessel, and when the temperature reached 20° C. (in 30 minutes), the reaction solution had become very viscous. Over the next 75 minutes, the completely colorless, transparent solution was warmed to 72° C. After stirring at this temperature for the next 18 hours, the mixture was cooled to 40° C. The resulting polymer solution was poured into 200 mls. of ice and water in a blender. The resulting fibrous solid was filtered and washed (in the blender) twice each with water, acetone and ether. The product was dried in a vacuum oven at 15 mm. pressure and 90° C. for 18 hours. The polymeric product, obtained in 99.5% yield, was a very light-yellow fibrous solid having the following recurring structural units:

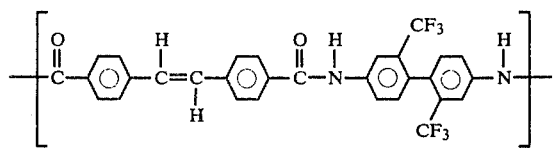

The inherent viscosity of a polymer solution (0.5 gram of the polymer of Example 11 per 100 mls. of a solution of five grams lithium chloride per 100 mls. of dimethylacetamide) was 4.735 dl./gram at 30° C. The molecular structure of the polymer was confirmed by infrared spectroscopy.

Elemental analysis for $C_{30}H_{18}F_6N_2O_2$ provided the following:

|  | % C | % H | % F | % N | % O |
|---|---|---|---|---|---|
| Calculated: | 65.22 | 3.28 | 20.64 | 5.07 | 5.79 |
| Found: | 64.54 | 3.76 | 19.04 | 4.85 | 7.81 (by difference) |

Thermogravimetric analysis showed that the onset of degradation of the polymer of Example 11 occurred at 500° C. in nitrogen and at 410° C. in air. Differential scanning calorimetry and thermal mechanical analysis of film samples detected a reproducible transition at about 185° C.

Polymeric films were prepared from the polymeric material of Example 10 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 1.0 to 5% wt./vol., i.e., from 1.0 gram to five gramps polymer per 100 mls. of the lithium chloride/dimethylacetamide solution. In each instance, the glass plate carrying the puddle-cast polymer solution was immersed in water (after minimal evaporation of solvent). The polymer film was observed to gel and a transparent and colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.997.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 60 to 65% elongation, to effect film orientation. The stretched films were optically transparent. Birefringence, measured with the aid of a quartz wedge, was 0.537.

Solutions of the polymer of Example 10 in lithium chloride/dimethylacetamide, as aforedescribed, were formed into extruded films by the "wet-jet" method whereby the solution of polymer is extruded into an aqueous coagulation bath for gelling of the polymer material. The resulting transparent, colorless film strips were soaked in water and cut to about 1 to 2 inches (25.4 to 50.8 mm.) for testing. The partially oriented strips of film produced by the extrusion were further oriented by stretching in the manner described in the Examples hereof. Stretching was effected to an elongation of less than 20%. The stretched strips were optically transparent. Infrared dichroism indicated that the films were 92% oriented. Measurement of birefringence utilizing a quartz wedge provided a birefringence value of 0.879.

EXAMPLE 11

This example illustrates the preparation of poly-[2,2'-bis(trifluoromethyl)-4,4'-biphenylene]-2,2'-dimethoxy-4,4'-biphenyl dicarboxamide and the preparation therefrom of birefringent polymeric films.

A 100-ml. reaction vessel (a resin-making kettle equipped with a mechanical stirrer, a pressure-equalizing dropping funnel, a nitrogen inlet tube and calcium chloride drying tube) was heated while simultaneously flushing the vessel with nitrogen. After the reaction vessel had cooled to room temperature, 3.0 grams of anhydrous lithium chloride and 0.4328 gram (0.001352 mole) of recrystallized 2,2'-bis(trifluoromethyl)benzidine were added while maintaining a positive nitrogen pressure. The reaction vessel was fitted with a thermometer and a rubber stopple and 20 mls. of anhydrous distilled N-methylpyrrolidinone (NMP) and 20 mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of −5° C. A small amount of lithium chloride precipitation was observed. Recrystallized 2,2'-dimethoxy-4,4'-biphenyldicarbonyl chloride (0.4586 gram; 0.001352 mole) was quickly added by means of a funnel to the stirred 2,2'-bis(trifluoromethyl)benzidine solution. An additional 20 mls. of TMU (at a temperature of 0° C.) were added through the funnel to the reaction mixture. The temperature of the reaction mixture did not rise above a temperature of 5° C. After stirring for 30 minutes, the reaction mixture began to thicken and turned milk-like in appearance. Stirring was continued for an additional 30 minutes at 0° C.

The ice bath was removed from the reaction vessel and the temperature was observed to rise to 20° C. in 30 minutes at which point the reaction mixture was viscous and opaque. Over the next 75 minutes, the opaque reaction mass was gently warmed to 40° C. at which point it became transparent. After stirring at this temperature for the next 18 hours, the reaction mixture was cooled to 30° C. and poured into 400 mls. of ice-water in a blender. The resulting fibrous solid was filtered and washed (in the blender) twice each with water and ether. The product was dried in a vacuum oven at 15 mm. pressure and 90° C. for 18 hours. The product, obtained in 99.3% yield, was an off-white fibrous polymeric material exhibiting solubility in acetone or tetrahydrofuran and having the following recurring structural units:

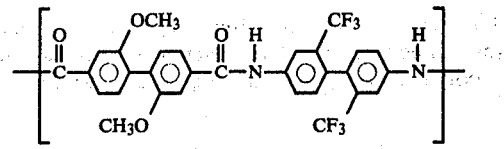

The inherent viscosity of a polymer solution (0.5 gram of the polymer of Example 11 per 100 mls. of a solution of five grams lithium chloride per 100 mls. of dimethylacetamide) was 1.69 dl./gram at 30° C.

Molecular structure was confirmed by infrared spectroscopy. Inspection of the ultraviolet visible spectrum of the polymer (in 5% wt./vol. lithium chloride/dimethylformamide) showed a $\lambda_{max}$ of 316 nm ($\epsilon = 2.59 \times 10^3$).

Elemental analysis for $C_{30}H_{20}F_6N_2O_4$ provided the following:

|  | % C | % H | % F | % N | % O |
|---|---|---|---|---|---|
| Calculated: | 61.34 | 3.43 | 19.41 | 4.77 | 10.89 |
| Found: | 59.82 | 3.51 | 18.70 | 4.62 | 13.35 (by difference) |

Thermogravinetic analysis showed that the onset of degradation of the polymer of Example 11 occurred at 470° C. in nitrogen and at 440° C. in air. Differential scanning colorimetry detected a reproducible transition at about 180° C.

Polymeric films were prepared from the polymeric material of Example 11 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 1% to 5% wt./vol., i.e., from 1.0 gram to 5 grams polymer per 100 mls. of the lithium chloride/dimethylacetamide solution. In each instance, the glass plate carrying the puddle-cast polymer solution was immersed in water (after minimal evaporation of solvent). The polymer was observed to gel and a transparent and colorless unoriented film separated from the soaked glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.73.

Solutions of the polymer of Example 11 in lithium chloride/dimethylacetamide, as aforedescribed, were formed into extruded films by the "wet-jet" method whereby the solution of polymer is extruded into an aqueous coagulation bath for gelling of the polymer material. The resulting transparent, colorless film strips were soaked in water and cut to about 1 to 2 inches (25.4 to 50.8 mm.) for testing. The partially oriented strips of film produced by the extrusion were further oriented by stretching in the manner described in the Examples hereof. Stretching was effected in air (at a temperature of 180° C.) to an elongation of less than 20%. The stretched film strips were optically transparent. Infrared dichroism indicated that the films were 92% oriented. Measurement of birefringence utilizing a quartz wedge provided a birefringence value of 0.586.

EXAMPLE 12

This example illustrates the preparation of poly-2,2'(bis-trifluoromethyl)-4,4'-biphenylene carboxamide, i.e., a polymer having the following recurring structural units:

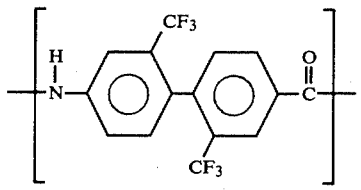

The polymer was prepared by polymerization (as described hereinafter) of the monomer 2,2'-bis(trifluoromethyl)-4-amino-4-biphenylcarboxylic acid having the structure

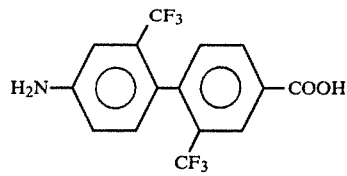

This monomer was prepared from 2,2'-bis(trifluoromethyl)-4,4'-dinitro-biphenyl by partial reduction using sodium hydrogen sulfide to provide 2,2'-bis(trifluoromethyl)-4-nitro-4'-amino-biphenyl; diazotization of the resulting compound followed by reaction with sodium triiodide to provide 2,2'-bis(trisfluoromethyl)-4-nitro-4'-iodo-biphenyl; a Rosenmund-von Braun reaction using cuprous cyanide in N-methyl-2-pyrrolidone to provide 2,2'-bis(trifluoromethyl)-4-nitro-4'-cyano-biphenyl; hydrolysis using 63% sulfuric acid to provide 2,2'-bis(trifluoromethyl)-4-nitro-4'-biphenyl carboxylic acid; and catalytic reduction using palladium on carbon to provide the aforesaid monomer 2,2'-bis(trifluoromethyl)-4-amino-4'-biphenyl carboxylic acid.

Into a dry 250-ml. reaction vessel (a Schlenk tube equipped with a magnetic stirring bar and a condenser topped with a calcium chloride drying tube) was placed 2.0 gram (0.0057 mole) of 2,2'-bis(trifluoromethyl)-4-amino-4'-biphenyl carboxylic acid, prepared in the manner aforedescribed. Thionyl chloride (10 mls.) was added and the reaction mixture was refluxed for two hours. After cooling to room temperature, excess thionyl chloride was removed by aspirator vacuum. The vacuum was released under an argon atmosphere and dry ether (150 mls.) was added. Gaseous hydrochloric acid (dried through a calcium chloride drying tube) was bubbled through the stirred contents of the reaction vessel which was cooled in an ice bath. When the resulting either solution had become saturated, the solid reaction product was allowed to settle under argon. Reaction solvent was removed by suction filtration through a fritted filter tube and the solid reaction product was washed three times with ether. The product was dried under high vacuum and the filter tube and magnetic stirring bar were removed. The reaction vessel was fitted with a mechanical stirrer and was cooled in a bath of dry ice and acetone. Tetramethylurea (TMU, 20 mls.) was added to the gently stirred solid which froze and caused cessation of stirring. An ice bath was substituted for the dry ice/acetone bath and stirring was again commenced. During the next hour, TMU (40 mls.) was added. The reaction mixture was allowed to warm to room temperature and was stirred overnight. The resulting colorless viscous solution was heated to 50° C. for two hours and, then, at 80° C. for five hours. The resulting hot solution was poured into water in a blender and the polymer precipitate was collected by vacuum filtration. The product was then dissolved in tetrahydrofuran and stirred overnight. The resulting solution was worked up in two batches, in each instance by pouring the solution into water (700 mls.) in a blender and collecting the polymeric product by vacuum filtration. The polymer was washed with water and was dried under high vacuum to yield a combined amount of polymer of 1.76 grams (93% yield). The inherent viscosity of the polymer in 5% wt./vol. lithium chloride/dimethyl acetamide at 30° C. was 5.0 dl./gram. Thermogravimetric analysis showed the onset of degradation in nitrogen at 450° C. and in air at 440° C. Molecular structure was confirmed by infrared spectroscopy. Refractive index of a film prepared from the polymer was 1.6367, measured by Brewster angle. A stretched film of the polymer showed a birefringence of 0.24 measured by using a quartz wedge.

EXAMPLE 13

This example illustrates the preparation of poly-3-methoxy-4,4'-stilbenylene carboxamide, i.e., a polymer having recurring units of the following structure:

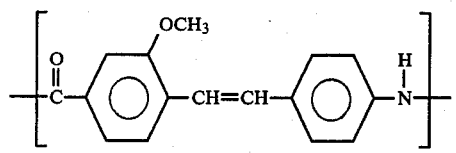

The polymer of this example was prepared by the polymerization (as described hereinafter) of the monomer 4-[2-(4-aminophenyl)ethenyl]-3-methoxybenzoic acid having the structure

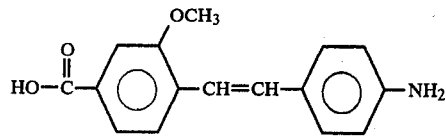

This monomer was prepared from 4-carbomethoxy-2-methoxybenzyl triphenylphosphinium bromide by: A Wittig reaction of the 4-carbomethoxy-2-methoxybenzyl triphenylphosphinium bromide with p-nitro-benzaldehyde to provide methyl-3-methoxy-4-[2-(4-nitrophenyl)ethenyl]benzoate; basic hydrolysis using potassium hydroxide to provide the corresponding acid, 3-methoxy-4-[2-(4-nitrophenyl)ethenyl]benzoic acid; and a basic reduction using ferrous sulfate heptahydrate and ammonium hydroxide to provide the corresponding aforedescribed amino compound, 4-[2-(4-aminophenyl)ethenyl]-3-methoxybenzoic acid.

Into a dry 100-ml. reaction vessel (a Schlenk tube fitted with a magnetic stirrer bar, a condenser topped with a calcium chloride drying tube and a nitrogen inlet) was placed, under nitrogen, 0.248 gram of 4-[2-(4-aminophenyl) ethenyl]-3-methoxybenzoic acid (prepared as aforedescribed.) Thionyl chloride (four mls.) was added and the resulting solution was brought to reflux at which time the solution became homogeneous. After one hohur, the solution was concentrated to one third of its volume. Dry benzene was added under nitrogen and the solution was again concentrated, nearly to dryness. Dry benzene (50 mls.) was then added and the cooled solution was saturated with gaseous hydrochloric acid. After stirring for two hours at room temperature, the precipitate was allowed to settle. The benzene was filtered off using a fritted filter tube under nitrogen and the solid product was washed three times with benzene and was dried under vacuum. The magnetic stirrer was replaced with a mechanical stirrer and the reaction vessel was cooled in dry ice/acetone bath. TMU (4 mls.) was added and the product immediately solidified. The dry ice/acetone bath was replaced by an ice bath and stirring was commenced to provide a homogeneous orange-colored solution. Additional TMU (two mls.) was added and after 30 minutes the solution was thick and cloudy. The solution remained cloudy after introduction of an additional quantity (eight mls.) of TMU. The ice bath was removed and additional TMU was added to bring final volume to 20 milliliters. The resulting solution was stirred at room temperature for six hours and then at 60° C. overnight. Dimethylacetamide was added to aid in transfer of the solution into a blender containing water. The polymer which precipitated was collected on a glass filter and was washed three times with water and once with acetone. The polymer showed solubility in hot sulfuric acid.

EXAMPLE 14

This example illustrates the preparation of 1:3 poly(3'-methoxy-4,4'-stilbenylene carboxamido-co-2,2'-bis-trifluoromethyl-4,4'-biphenylene carboxamide), i.e., a polymer containing the following repeating units:

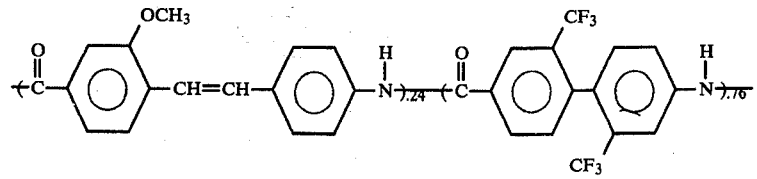

Into a dry 100-ml. reaction vessel (a Schlenk tube fitted with a magnetic stirring bar and a condenser with a calcium chloride drying tube attached to an argon inlet) were added 0.318 gram (0.00091 mole) of 4-amino-2,2'-bistrifluoromethyl-4'-carboxybiphenyl and 0.081 gram (0.00030 mole) of 4-[2-(4-aminophenyl)ethenyl]-3-methoxybenzoic acid. Thionyl chloride (five mls.) was added and the resulting solution was refluxed for one hour. After cooling to room temperature, the thionyl chloride was removed under reduced pressure. Dry benzene (20 mls.) and dry ether (7 mls.) were added and the solution was cooled in an ice bath. Dry hydrochloric acid gas was bubbled through the solution for 45 minutes. Ether (15 mls.) was added and the resulting precipitate was allowed to settle. The solvent was removed by suction filtration through a fritted filter tube and the resulting solid product was washed six times with ether. The precipitate was dried under high vacuum and the filter tube and magnetic stirrer were removed. The reaction vessel was fitted with a mechanical stirrer. After cooling the flask in a dry ice/acetone bath, TMU (four mls.) with 4% lithium chloride was added and the product immediately froze. An ice bath was then substituted for the dry ice/acetone bath, and as the solution warmed, stirring commenced. Additional TMU (six mls.) was added and the solution was carried at 0° C. for one hour. The solution became very thick and dark in color. The mixture was allowed to warm to room temperature and was stirred until thickening and gelation caused stirring to cease. N-methylpyrolidinone (NMP, eight mls.) and TMU (six mls.) were added to the resulting gel and stirring was restarted. The reaction mixture was heated in an oil bath at 60° C. for four hours. After cooling to room temperature, the solution was poured into water stirring in a blender. A polymeric precipitate was collected by vacuum filtration and was washed twice with water and once with ether. The product was vacuum dried in an oven to yield 0.380 gram (99%) of a yellow fibrous solid. The inherent viscosity of the polymer (dissolved in 6% wt./vol. lithium chloride/dimethylacetamide at 30° C.) was 4.737 dl./gram.

EXAMPLE 15

This example illustrates the preparation of 1:9 poly(3-methoxy-4,4'-stilbenylene carboxamide-co-2,2'-bis-trifluoromethyl-4,4'-biphenylene carboxamide), i.e., a copolymer having the following recurring units:

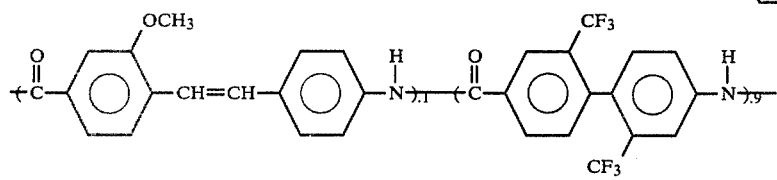

Into a 100-ml. Schlenk reaction vessel (fitted with a magnetic stirring bar and condenser having a calcium chloride tube attached to an argon inlet on top) were added 0.60 gram (0.00172 mole) of 4-amino-2,2'-bistrifluoromethyl-4'-carboxybiphenyl and 0.050 gram (0.00186 mole) of 4-[2-(4-aminophenyl)ethenyl]-3-methoxybenzoic acid. Thionyl chloride (six mls.) was added to the reaction solution and the solution was refluxed for two hours. After cooling to room temperature, the thionyl chloride was removed under reduced pressure. Dry benzene (tem mls.) and dry ether (ten mls.) were added through a cannular and the resulting solution was cooled in an ice bath. Hydrochloric gas (dried through a calcium chloride tube) was bubbled through the solution for one hour. After the polymeric precipitate had settled, reaction solvent was removed by suction filtration through a filtering tube and the solid product was washed three times with ether. The precipitate was dried under high vacuum and the filter stick and magnetic stirrer were removed. The reaction vessel was fitted with a mechanical stirrer. After cooling the flask in a dry ice/acetone bath, TMU (four mls.) with 4% lithium chloride was added and the product immediately froze. An ice bath was then substituted for the dry ice/acetone bath, and as the solution warmed, stirring started. Addditional TMU (eight mls.) was added and the solution was stirred at 0° for one hour. After 30 minutes, additional TMU (three mls.) was added. Undissolved material was broken up with the stirring bar and additional TMU was added for a total volume of 30 milliliters. The solution was stirred at room temperature for two hours and at 70° C. overnight. The cooled solution was poured into water stirring in a blender. The resulting precipitate was collected by vacuum filtration washed twice with water and once with ether. The product was vacuum dried to yield 0.496 gram (78%) of a pale yellow fibrous solid. The inherent viscosity of the polymer dissolved in 5% wt./vol. lithium chloride/dimethylacetamide at 30° C. was 4.94 dl./gram. Thermogravimetric analysis showed that the onset of degradation occurred in nitrogen at 440° C. Molecular structure was confirmed by infrared spectroscopy. The refractive index of a film of the resulting copolymer, measured by Brewster angle, was 1.7015. Birefringence of a stretched film, measured by means of a quartz wedge, was 0.23.

EXAMPLE 16

For purposes of comparison with the substituted polyamides of the present invention, an unsubstituted polyamide was prepared and evaluated in the following manner.

A solution polymerization reaction for the production of poly(p-benzamide) was conducted in accordance with the following reaction scheme:

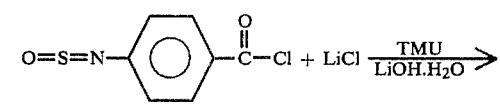

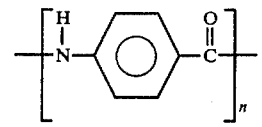

A 50-ml. reaction vessel (a resin-making kettle equipped with mechanical stirrer, nitrogen inlet tube and calcium chloride drying tube) was heated while simultaneously flushing the vessel with nitrogen. After the reaction vessel had cooled to room temperature, 40 mls. of anhydrous distilled tetramethyl urea (TMU), 8.04 grams (0.04 mole) of vacuum-distilled p-thionylaminobenzoyl chloride and 0.52 gram (0.012 mole) of lithium chloride were added while maintaining a positive nitrogen pressure. The resulting reaction mixture was stirred for ten minutes at room temperature and 1.68 grams (0.04 mole) of lithium hydroxide monohydrate were added while vigorously stirring. The reaction mixture was then stirred for one hour at room temperature. After a period of seven additional minutes, the reaction mixture became cloudy and was observed to thicken. The polymeric reaction product, after 20 minutes, thickened sufficiently to adhere the shaft of the mechanical stirrer. After one-half hour, the reaction mixture, which could not be stirred, was heated. An additional quantity (14 mls.) of TMU was added at which point the reaction mixture still could not be stirred. The reaction mixture was then heated to 130° C. without stirring. After two hours of heating at 130° C., pliability of polymeric reaction mass increased and the product appeared to have partially dissolved. The reaction product was stored in the reaction vessel overnight and was washed with water, filtered and washed with acetone then ether. The product, poly(p-benzamide) was dried in a vacuum oven at 80° C. for two hours.

The inherent viscosity of a polymer solution of poly(p-benzamide) in sulfuric acid was 1.60 dl./gram at 30° C.

Polymeric films of poly(p-benzamide) were prepared by casting a solution of the polymeric material in a 5% wt./vol. solution of lithium chloride and dimethylacetamide (five grams lithium chloride per 100 mls. of dimethylacetamide). The concentration of polymer was 5% wt./vol., i.e., five grams polymer per 100 mls. of the lithium chloride/dimethylacetamide solution. The cast polymer film was dried in a vacuum oven at 90° C. (30 in. Hg) overnight. The polymer film was an opaque, white flexible film. Additional films were formed by puddle-casting the solution as aforedescribed onto glass plates. In each instance, the glass plate carrying the puddle-cast polymer solution was immersed in water (after most of the solvent had evaporated). The polymer film which separated from the glass plate was a tough, transparent, flexible film. The resulting film was soaked for several hours in water to effect extraction of occluded lithium chloride and solvent.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical stretcher and were unidirectionally stretched, successively, in steam and in air (at 200° C.). The strips were stretched to an elongation of approximately 10%. The resulting stretched films were clouded in appearance. Optical retardation was measured with a calibrated quartz wedge; film thickness was measured with a micrometer. Birefringence, measured by means of a quartz wedge, was 0.23.

EXAMPLE 17

Geometric indices were determined for the repeating units of polymeric materials having the following structure

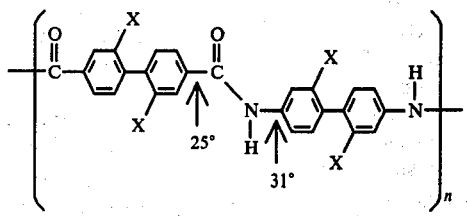

wherein each X is hydrogen or a substituent as set forth in the following TABLE I. In the case of each recurring unit, the eccentricity factor $(1+e_L)/(1+e_T)$ was calculated and is reported in TABLE I. Bond and group polarizability tensors were utilized to calculate a polarizability matrix for each repeat unit, the diagonalized form of the matrix providing the X, Y and Z contributions to the unit polarizability ellipsoid. Axial polarizabilities, i.e., X, Y and Z, were utilized to calculate longitudinal and transverse eccentricities of each repeat unit, thus, reflecting its symmetry.

Eccentricity values were calculated utilizing the following procedure. A polarizability and a corresponding orthogonal coordinate system is assigned to each segment of the polymer repeat unit. Literature values for group polarizabilities are utilized from the literature, or where not available, are constructed from bond polarizabilities. Available Denbigh values were utilized herein for all calculations. Bond polarizabilities are utilized to connect segments where necessary. To determime the overall polarizability of the repeat unit, the coordinate system of the segment at one end of the repeat unit is made coincident with that of the adjacent segment by means of the appropriate rotation(s). This procedure is repeated on each successive segment until the last segment is reached. Mathematically, this means that the matrix of one segment must be pre- and post-multiplied by a transformation matrix:

$$\alpha_1' = Y\alpha_1 Y^{-1}$$

where $\alpha_1$ is the polarizability of segment 1; Y is the transformation matrix; $Y^{-1}$ is the inverse of Y; and $\alpha_1'$ is the polarizability of segment 1 in the coordinate system of segment 2. The value of $\alpha_1'$ is then added to $\alpha_2$ and the transformation repeated. The repeat unit polarizability matrix is diagonalized, thus, providing a repeat unit polarizability ellipsoid with three semi-axes, i.e., $\alpha_{xx}$, $\alpha_{yy}$, and $\alpha_{zz}$, where $\alpha_{xx}$ is the major polarizability and is coincident with the polymer backbone.

Literature-reported values of 25° and 31°, respectively, were utilized in all calculations as representing the dihedral angle between the phenyl and carbonyl moieties and the dihedral angle between the phenyl and amino moieties, respectively. Experimentally determined values for the dihedral angle between each X-substituted phenyl moiety were utilized in all calculations and are reported in TABLE I. Mean diameter values, D, and length, L, were obtained from space-filling molecular models.

TABLE I

| Substituent X (Dihedral Angle) | Mean Diameter (D) | Length (L) | $\left(\dfrac{1+e_L}{1+e_T}\right)$ | G |
|---|---|---|---|---|
| H (20°) | 4.49 | 21.35 | 1.061 | 0.989 |
| F (60°) | 4.61 | 21.35 | 1.206 | 1.21 |
| Cl (72°) | 4.78 | 21.35 | 1.348 | 1.23 |
| Br (75°) | 4.83 | 21.35 | 1.388 | 1.24 |
| I (85°) | 4.91 | 21.35 | 1.428 | 1.26 |
| CF$_3$ (80°) | 4.90 | 21.35 | 1.496 | 1.33 |
| CH$_3$ (71°) | 4.76 | 21.35 | 1.330 | 1.25 |

From the data presented in TABLE I will be observed the influence of the nature of the X substituent relative to a hydrogen atom as regards the reported dihedral angle and resulting substantial noncoplanarity between interbonded phenyl rings. Differences in mean diameter and influence of the nature of X substituents on mean diameter and eccentricity factor, and correspondingly, geometric index G will also be observed. Thus, it will be noted that the largest substituents, i.e., —CF$_3$ and —I substituents, corresponded with the largest dihedral angles between interbonded phenyl groups or the highest non-coplanarity and, accordingly, recurring units having such substituents show high geometric index values.

For purposes of comparison, geometric index G was calculated for the repeat unit of poly(p-phenylene)-terephthalamide having the following structure and the results thereof are reported in TABLE II. Dihedral angle values of 25° and 31° were utilized for purposes of calculation as in the case of the repeat units of EXAMPLE 17.

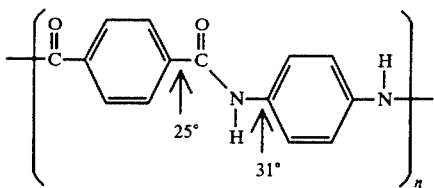

TABLE II

| Mean Diameter (D) | Length (L) | $\frac{1+e_L}{1+e_T}$ | G |
|---|---|---|---|
| 4.43 | 12.45 | 0.978 | 0.621 |

As can be observed from inspection of the data reported in TABLES I and II, the geometric indices for the repeat units of the materials set forth in TABLE I are considerably higher than the geometric index calculated for poly(p-phenylene)terephthalamide of TABLE II.

EXAMPLE 18

Geometric indices for the recurring units of polyamides having the following structure were calculated. Each X substituent was as indicated in TABLE III. Dihedral angles from the literature were utilized in such calculations. Calculated geometric indices were compared with values of theoretical maximum birefringence for the polymeric materials, reported in TABLE III. Theoretical maximum birefringence values ($\Delta n_{max}$) were obtained by plotting the orientation function, calculated from infrared dichroism, against experimental birefringence and extrapolating to 100% orientation. The results are set forth in TABLE III.

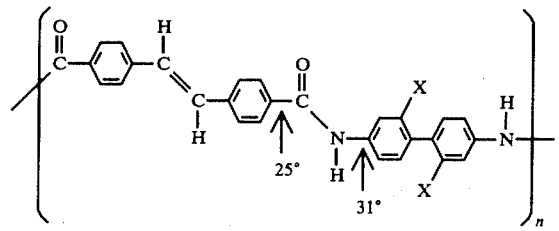

TABLE III

| Substituent X (Dihedral Angle) | G | $\Delta n_{max}$ |
|---|---|---|
| —Br (75°) | 1.20 | 1.20 |
| —CF$_3$ (80°) | 1.17 | 0.98 |

From the data presented in TABLE III, it will be seen that high values of geometric index G corresponded with high values of $\Delta n_{max}$. For purposes of comparison, the theoretical maximum birefringence value ($\Delta n_{max}$) for the recurring unit of poly(p-phenylene)terephthalamide (having a G value of 0.621 as shown in TABLE II) was also determined. The resulting $\Delta n_{max}$ value of 0.83 for poly(p-phenylene)terephthalamide was higher than would be predicted from the geometric index value, G, of 0.621. This is believed to be the result of the highly crystalline nature of the poly(p-phenylene)terephthalamide material, whereas the geometric index G reflects the inherent anisotropy of an isolated chain independent of such macroscopic properties as morphology, density, color or the like.

The enhanced optical anisotropy exhibited by the preferred substituted-aromatic polyamide materials utilized in the optical devices hereof is believed to be the result of the rigid, rod-like uniaxial molecular structure of such materials and the amorphous/crystalline ratio thereof. This ratio typically ranges from about 10:1 to about 20:1. In the case of highly unidirectionally oriented phenyl-type polyamides this ratio generally will be in the range of about 0.3:1. The presence of crystallites is generally detrimental in polymeric materials adapted to utilization in optical devices owing to light scattering and diminished transparency. The noncoplanarity between substituted biphenyl rings, resulting from sterically bulky groups on the ortho positions of interbonded phenyl rings, raises the amorphous/crystalline ratio to a range of from about 10:1 to about 20:1. This permits the fabrication of highly oriented films and fibers exhibiting high transparency in addition to high birefringence. The ring-substituted biphenyl polyamides additionally exhibit enhanced solubility and can be fabricated into colorless films or fibers where desired.

EXAMPLE 19

A light-polarizing device utilizing a highly birefringent polyamide material was constructed in the following manner.

A sheet of birefringent material was prepared from the polyamide of Example 10, i.e., poly[2,2'-bis(trifluoromethyl)-4,4'-biphenylene]-trans-p,p'-stilbene dicarboxamide. The sheet was prepared by the "wet-jet" extrusion method described in Example 10. The resulting extruded polymer, in the form of a partially oriented transparent colorless film, was soaked in water and cut into strips. The strips were then further oriented by stretching in air in the manner also described in Example 10. A strip of the birefringent polymer (having perpendicular and parallel indices of refraction, respectively, of approximately 1.72 and 2.34 and an approximate thickness of 25 microns) was embossed by contacting one surface of the strip with a brass prismatic plate heated to a temperature of 180° C. and pressing the heated plate onto the surface of the film so as to provide a pristmatic layer of birefringent material generally shown in FIG. 6 as layer 42.

Onto a sheet of transparent isotropic glass material of approximately one-mm. thickness was poured a layer of polychlorinated biphenyl, an isotropic material having an index of refraction of 1.654, available as Aroclor 1260 from Monsanto Company, St. Louis, Mo. The prismatic layer of birefringent material, prepared as aforesaid, was placed onto the layer of Aroclor. The prismatic layer was covered with a second layer of Aroclor so as to embed the prismatic layer in Aroclor material. A second sheet of glass was placed onto the Aroclor so as to sandwich the birefrigent and Aroclor materials between the two pieces of glass. The resulting polarizer device was tested for its light polarizing properties by placing the test device and a second polarizer into the path of a light beam and by observing the attenuation of light resulting from rotation of the respective polarizers.

What is claimed is:

1. A film- or fiber-forming polymer comprising recurring units of the formula

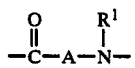

wherein $R^1$ is hydrogen, alkyl, aryl, alkaryl or aralkyl and A is a divalent radical selected from the group consisting of:
(1) a radical

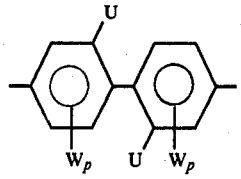

where each U is a substituent other than hydrogen, each W is hydrogen or a substituent other than hydrogen, and each p is an integer from 1 to 3, said U and $W_p$ substitution being sufficient to provide the aromatic nuclei of said radical with a non-coplanar molecular configuration with respect to each other; and
(2) a radical

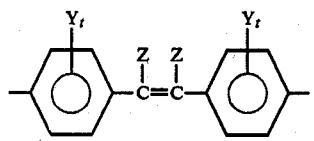

where each of Y and Z is hydrogen or a substituent other than hydrogen and each t is an integer from 1 to 4, with the proviso that when each said Z is hydrogen, at least one said Y substituent is a substituent other than hydrogen positioned on the corresponding nucleus ortho with respect to the

moiety of said radical, said Z and $Y_t$ substitution being sufficient to provide the aromatic nuclei of said radical with a non-coplanar molecular configuration with respect to each other.

2. The film- or fiber-forming polymer of claim 1 wherein said divalent radical A is said radical having the formula

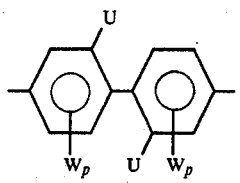

wherein each U is a substituent other than hydrogen, each W is hydrogen or a substituent other than hydrogen and each p is an integer from 1 to 3, said U and $W_p$ substitution being sufficient to provide the aromatic nuclei of said radical with a non-coplanar molecular configuration with respect to each other.

3. The film- or fiber-forming polymer of claim 2 wherein $R^1$ is hydrogen.

4. The film- or fiber-forming polymer of claim 2 wherein said divalent radical is a radical having the formula

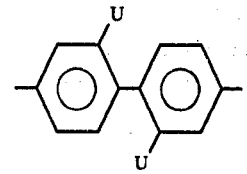

wherein each U is a substituent other than hydrogen.

5. The film- or fiber-forming polymer of claim 4 wherein each U substituent is selected from the group consisting of halogen, nitro, alkoxy and substituted-alkyl.

6. The film- or fiber-forming polymer of claim 5 wherein each U substituent is bromo.

7. The film- or fiber-forming polymer of claim 5 wherein each U substituent is nitro.

8. The film- or fiber-forming polymer of claim 5 wherein each U substituent is trifluoromethyl.

9. The film- or fiber-forming polymer of claim 8 wherein $R^1$ is hydrogen.

10. The film- or fiber-forming polymer of claim 1 wherein said divalent radical A is a radical having the formula

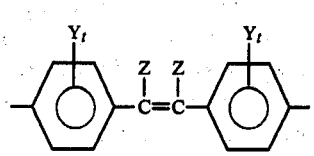

where each of Y and Z is hydrogen or a substituent other than hydrogen and each t is an integer from 1 to 4, with the proviso that when each said Z is hydrogen, at least one said Y substituent is a substituent other than hydrogen positioned on the corresponding nucleus ortho with respect to the

moiety of said radical, said Z and $Y_t$ substitution being sufficient to provide the aromatic nuclei of said radical with a non-coplanar molecular configuration with respect to each other.

11. The film- or fiber-forming polymer of claim 10 wherein $R^1$ is hydrogen.

12. The film- or fiber-forming polymer of claim 10 wherein each said Z is hydrogen, each said t is the integer one and each corresponding Y substituent is a substituent other than hydrogen positioned on the

moiety of the radical.

13. The film- or fiber-forming polymer of claim 12 wherein each said Y substituent is selected from the group consisting of halogen, nitro and alkoxy.

14. The film- or fiber-forming polymer of claim 10 wherein each Y is hydrogen, each t is the integer four, one said Z is hydrogen, and the remaining said Z substituent is halogen.

15. The film- or fiber-forming polymer of claim 14 wherein said halogen is bromo.

16. A molecularly oriented birefringent polymer in the form of a film or fiber comprising recurring units of the formula

wherein $R^1$ is hydrogen, alkyl, aryl, alkaryl or aralkyl and A is a divalent radical selected from the group consisting of:

(1) a radical

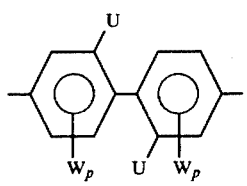

where each U is a substituent other than hydrogen, each W is hydrogen or a substituent other than hydrogen and each p is an integer from 1 to 3, said U and $W_p$ substitution being sufficient to provide the aromatic nuclei of said radical with a non-coplanar molecular configuration with respect to each other; and (2) a radical

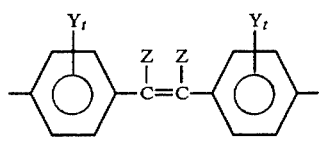

where each of Y and Z is hydrogen or a substituent other than hydrogen and each t is an integer from 1 to 4, with the proviso that when each said Z is hydrogen, at least one said Y substituent is a substituent other than hydrogen positioned on the corresponding nucleus ortho with respect to the

moiety of said radical, said Z and $Y_t$ substitution being sufficient to provide the aromatic nuclei of said radical with a non-coplanar molecular configuration with respect to each other.

17. The polymeric film or fiber of claim 16 wherein said divalent radical A is said radical having the formula

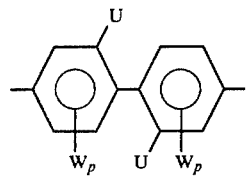

wherein each U is a substituent other than hydrogen, each W is hydrogen or a substituent other than hydrogen and each p is an integer from 1 to 3, said U and $W_p$ substitution being sufficient to provide the aromatic nuclei of said radical with a non-coplanar molecular configuration with respect to each other.

18. The polymeric film or fiber of claim 17 wherein $R^1$ is hydrogen.

19. The polymeric film or fiber of claim 17 wherein said divalent radical is a radical having the formula

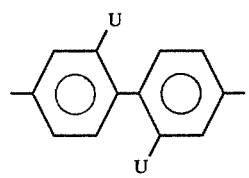

wherein each U is a substituent other than hydrogen.

20. The polymeric film or fiber of claim 19 wherein each U substituent is selected from the group consisting of halogen, nitro, alkoxy and substituted-alkyl.

21. The polymeric film or fiber of claim 20 wherein each U substituent is bromo.

22. The polymeric film or fiber of claim 20 wherein each U substituent is nitro.

23. The polymeric film or fiber of claim 20 wherein each U substituent is trifluoromethyl.

24. The polymeric film or fiber of claim 23 wherein $R^1$ is hydrogen.

25. The polymeric film or fiber of claim 16 wherein said divalent radical A is a radical having the formula

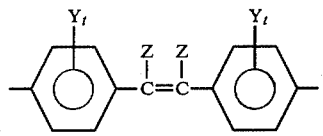

where each of Y and Z is hydrogen or a substituent other than hydrogen and each t is an integer from 1 to 4, with the proviso that when each said Z is hydrogen, at least one said Y substituent is a substituent other than hydrogen positioned on the corresponding nucleus ortho with respect to the

moiety of said radical, said Z and $Y_t$ substitution being sufficient to provide the aromatic nuclei of said radical with a non-coplanar molecular configuration with respect to each other.

26. The polymeric film or fiber of claim 25 wherein $R^1$ is hydrogen.

27. The polymeric film or fiber of claim 25 wherein each said Z is hydrogen, each said t is the integer one and each corresponding Y substituent is a substituent other than hydrogen positioned on the

moiety of the radical.

28. The polymeric film or fiber of claim 27 wherein each said Y substituent is selected from the group consisting of halogen, nitro and alkoxy.

29. The polymeric film or fiber of claim 25 wherein each Y is hydrogen, each t is the integer four, one said Z is hydrogen, and the remaining said Z substituent is halogen.

30. The polymeric film or fiber of claim 29 wherein said halogen is bromo.

* * * * *